(12) United States Patent
Toyama et al.

(10) Patent No.: US 10,808,598 B2
(45) Date of Patent: Oct. 20, 2020

(54) COOLING DEVICE AND COOLING METHOD FOR INTERNAL COMBUSTION ENGINE

(71) Applicant: Hitachi Automotive Systems, Ltd., Hitachinaka-shi, Ibaraki (JP)

(72) Inventors: Yuichi Toyama, Isesaki (JP); Atsushi Murai, Isesaki (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 0 days.

(21) Appl. No.: 16/617,654

(22) PCT Filed: Mar. 23, 2018

(86) PCT No.: PCT/JP2018/011676
§ 371 (c)(1),
(2) Date: Nov. 27, 2019

(87) PCT Pub. No.: WO2018/225337
PCT Pub. Date: Dec. 13, 2018

(65) Prior Publication Data
US 2020/0116072 A1 Apr. 16, 2020

(30) Foreign Application Priority Data
Jun. 9, 2017 (JP) .................................. 2017-114700

(51) Int. Cl.
*F01P 7/16* (2006.01)
*F01P 3/20* (2006.01)
(Continued)

(52) U.S. Cl.
CPC ........ *F01P 7/16* (2013.01); *F01P 3/20* (2013.01); *F01P 5/10* (2013.01);
(Continued)

(58) Field of Classification Search
CPC ........ F01P 7/16; F01P 3/20; F01P 5/10; F01P 2003/027; F01P 2007/146; F01P 2060/08;
(Continued)

(56) References Cited

U.S. PATENT DOCUMENTS

2005/0034688 A1    2/2005 Lelkes et al.
2007/0272173 A1*  11/2007 Reckels .................. G06F 19/00
                                                         123/41.11

(Continued)

FOREIGN PATENT DOCUMENTS

DE    11 2016 000 266 T5    9/2017
JP       2002-227646 A       8/2002
(Continued)

OTHER PUBLICATIONS

International Search Report (PCT/ISA/210) issued in PCT Application No. PCT/JP2018/011676 dated Jun. 19, 2018 with English translation (five (5) pages).
(Continued)

*Primary Examiner* — Hung Q Nguyen
(74) *Attorney, Agent, or Firm* — Crowell & Moring LLP

(57) ABSTRACT

At cold start of an internal combustion engine having an EGR system configured to recirculate, to an intake system, a portion of exhaust gas from the internal combustion engine, supply of a coolant to an EGR cooler and an air conditioning heater which are provided in a coolant circuit for circulating the coolant through the internal combustion engine and an outside thereof is shut off, when a temperature of the coolant is less than a predetermined temperature, and supply of the coolant to the air conditioning heater is allowed and supply of the coolant to the EGR cooler is shut off until the EGR system is activated, when the temperature of the coolant is equal to or higher than the predetermined temperature.

10 Claims, 15 Drawing Sheets

(51) Int. Cl.
　　　*F02M 26/28*　　　(2016.01)
　　　*F02M 26/33*　　　(2016.01)
　　　*F01P 5/10*　　　(2006.01)
　　　*F01P 3/02*　　　(2006.01)
　　　*F01P 7/14*　　　(2006.01)

(52) U.S. Cl.
　　　CPC ... *F01P 2003/027* (2013.01); *F01P 2007/146* (2013.01); *F01P 2060/08* (2013.01); *F01P 2060/16* (2013.01); *F02M 26/28* (2016.02); *F02M 26/33* (2016.02)

(58) Field of Classification Search
　　　CPC ..... F01P 2060/16; F02M 26/28; F02M 26/33; F02M 26/30; F16K 11/072
　　　See application file for complete search history.

(56) References Cited

U.S. PATENT DOCUMENTS

| | | |
|---|---|---|
| 2012/0067545 A1 | 3/2012 | Yamazaki et al. |
| 2016/0090944 A1 | 3/2016 | Takahashi et al. |
| 2016/0153343 A1* | 6/2016 | Kakehashi ......... B60H 1/00885 123/41.31 |
| 2017/0248056 A1* | 8/2017 | Styles ....................... F01N 5/02 |
| 2017/0370272 A1 | 12/2017 | Koguchi et al. |

FOREIGN PATENT DOCUMENTS

| | | |
|---|---|---|
| JP | 2005-61417 A | 3/2005 |
| JP | 2012-62850 A | 3/2012 |
| JP | 2012-184671 A | 9/2012 |
| JP | 2015-110919 A | 6/2015 |
| JP | 2016-61251 A | 4/2016 |
| JP | 2016-65515 A | 4/2016 |
| JP | 2016-79890 A | 5/2016 |
| WO | WO 2016/121318 A1 | 8/2016 |

OTHER PUBLICATIONS

Japanese-language Written Opinion (PCT/ISA/237) issued in PCT Application No. PCT/JP2018/011676 dated Jun. 19, 2018 (four (4) pages).

International Preliminary Report on Patentability (PCT/IPEA/409 & PCT/IPEA/416) issued in PCT Application No. PCT/JP2018/011676 dated Nov. 16, 2018 with partial English translation (eight (8) pages).

German-language Office Action issued in German Application No. 11 2018 002 922.0 dated Jun. 23, 2020 with partial English translation (17 pages).

* cited by examiner

SECOND OPENING MODE M2

THIRD OPENING MODE M3

FOURTH OPENING MODE M4

FIFTH OPENING MODE M5

COOLING DEVICE AND COOLING METHOD FOR INTERNAL COMBUSTION ENGINE

TECHNICAL FIELD

The present invention relates to a cooling device and a cooling method for an internal combustion engine.

BACKGROUND ART

Patent Document 1 discloses a well-known example of a cooling device and a cooling method for an internal combustion engine. In the disclosure, the internal combustion engine has an exhaust gas recirculation (EGR) system for recirculating, to the intake system, a portion of exhaust gas from the internal combustion engine. After the cooling water has been used for cooling the internal combustion engine, the cooling water is supplied to multiple paths, including a path in which an EGR cooler configured to cool recirculated exhaust gas and an air conditioning heater included in a vehicle air conditioner are disposed in series. In this event, the cooling water is supplied to the EGR cooler and the air conditioning heater in accordance with the temperature of the cooling water and the open/close of the EGR control valve.

REFERENCE DOCUMENT LIST

Patent Document

Patent Document 1: JP 2016-065515 A

SUMMARY OF THE INVENTION

Problem to be Solved by the Invention

In the above technique, when the EGR system is not in operation at cold start of the internal combustion engine, the EGR cooler removes heat from the cooling water so that the cooling water that has been used for cooling of the internal combustion engine and has increased in temperature again decreases in temperature. This not only reduces the start-up performance of the air heating function of the air conditioning heater provided by heat exchange between air for air-conditioning and the cooling water but also delays activation of the EGR system, which are problematic.

In view of the above problems, the present invention has been made to provide a cooling device and a cooling method for an internal combustion engine capable of improving the start-up performance of the air heating function and reducing the time to activation of the EGR system at cold start of the internal combustion engine.

Means for Solving the Problem

According to an aspect of the present invention, a cooling device for an internal combustion engine having an EGR system configured to recirculate, to an intake system, a portion of exhaust gas from the internal combustion engine includes: a coolant circuit for circulating a coolant through the internal combustion engine and an outside thereof; a flow rate adjusting mechanism configured to individually adjust a flow rate of the coolant through an EGR cooler provided in the coolant circuit and a flow rate of the coolant through an air conditioning heater provided in the coolant circuit; and control means configured to control the flow rate adjusting mechanism. At cold start of the internal combustion engine, the control means controls the flow rate adjusting mechanism so as to shut off supply of the coolant to the EGR cooler and the air conditioning heater, when a temperature of the coolant is less than a predetermined temperature, and allow supply of the coolant to the air conditioning heater and shut off supply of the coolant to the EGR cooler until the EGR system is activated, when the temperature of the coolant is equal to or higher than the predetermined temperature.

According to another aspect of the present invention, a method for cooling an internal combustion engine having an EGR system configured to recirculate, to an intake system, a portion of exhaust gas from the internal combustion engine includes: at cold start of the internal combustion engine, shutting off supply of a coolant to an EGR cooler and an air conditioning heater which are provided in a coolant circuit for circulating the coolant through the internal combustion engine and an outside thereof, when a temperature of the coolant is less than a predetermined temperature; and allowing supply of the coolant to the air conditioning heater and shutting off supply of the coolant to the EGR cooler until the EGR system is activated, when the temperature of the coolant is equal to or higher than the predetermined temperature.

Effects of the Invention

According to the cooling device and cooling method for an internal combustion engine of the present invention, it is possible to improve the start-up performance of the air heating function and to reduce the time to activation of the EGR system at cold start of the internal combustion engine.

MODE FOR CARRYING OUT THE INVENTION

Figure 1:
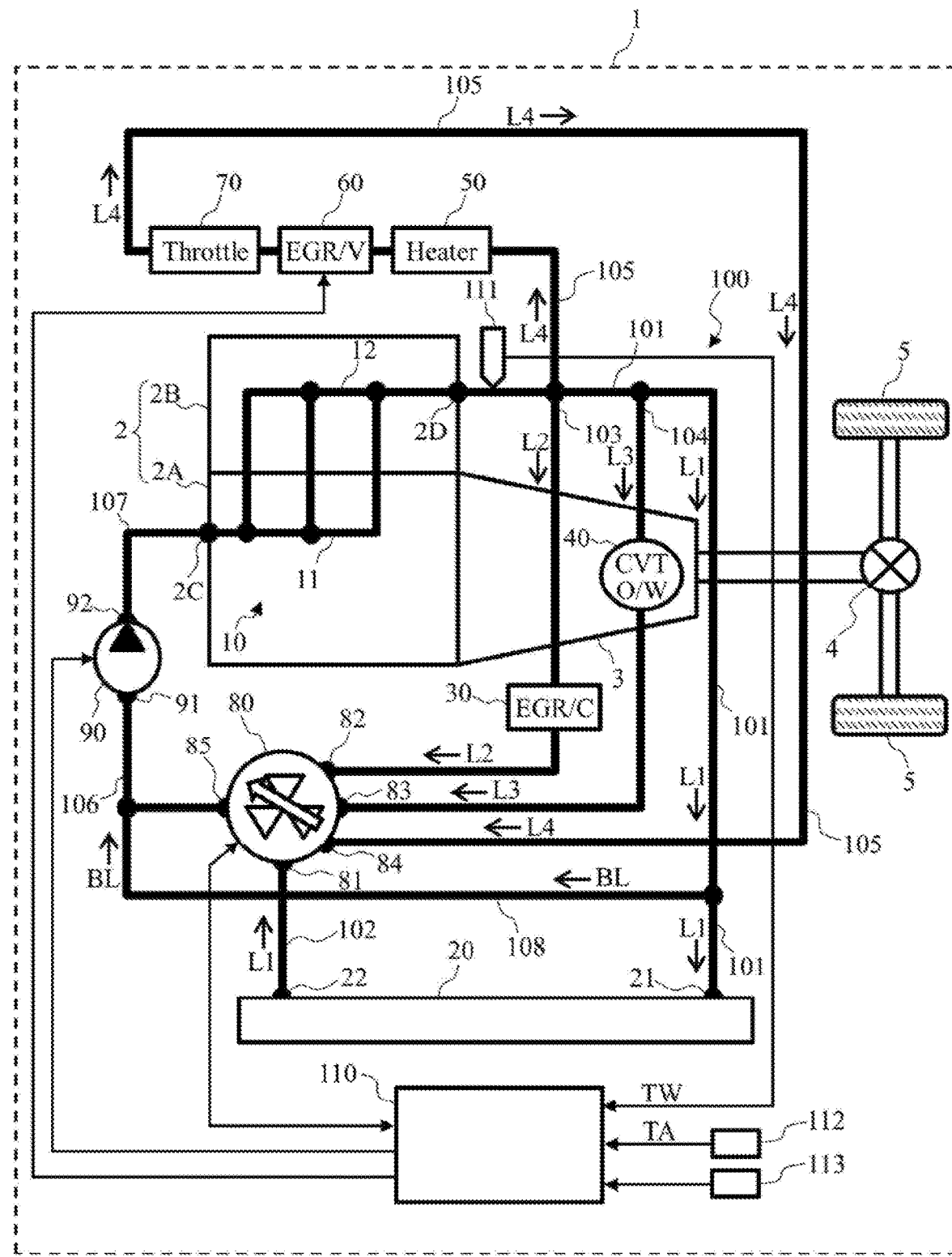
FIG. 1 is a schematic view of a cooling device for an internal combustion engine according to an embodiment of the present invention.

Hereinafter, an embodiment of the present invention will be described in detail with reference to the accompanying drawings. FIG. 1 is a configuration diagram illustrating an example of a cooling device for an internal combustion engine of a vehicle according to the present invention. As used herein, the term "coolant" used in the cooling device for an internal combustion engine encompasses various coolants, such as engine antifreeze coolants standardized under Japanese Industrial Standard K2234.

An internal combustion engine 2, which is installed in a vehicle 1, is used as a power source for driving vehicle 1. A transmission 3 such as a continuously variable transmission (CVT), which is an example of a powertrain, is coupled to the output shaft of internal combustion engine 2. The output of transmission 3 is transmitted to drive wheels 5 of vehicle 1 via a differential gear 4.

The cooling device for internal combustion engine 2 is a water-based cooling device including a cooling water circuit (coolant circuit) for circulating a cooling water which works as a coolant through internal combustion engine 2 and the outside thereof. The cooling device for internal combustion engine 2 includes a cooling water passage 10 provided in internal combustion engine 2, a radiator 20, an EGR cooler 30, an oil warmer 40 for transmission 3 (transmission oil heat exchanger), a heater core 50, an EGR control valve 60, a throttle valve 70, a flow rate control valve (path switching means) 80, an electric water pump 90, pipes 100 connecting these components, and a controller 110.

Cooling water passage 10 includes a cylinder block cooling water passage (in-block cooling water passage) 11 provided in a cylinder block 2A of internal combustion engine 2, and a cylinder head cooling water passage (in-head cooling water passage) 12 provided in a cylinder head 2B of internal combustion engine 2.

Cylinder block cooling water passage 11 extends in cylinder block 2A in the cylinder arrangement direction from a cooling water inlet 2C provided at one end in the cylinder arrangement direction of internal combustion engine 2, and divides into branches extending to cylinder head 2B along the individual cylinders. Accordingly, cylinder block cooling water passage 11 has a function to cool cylinder block 2A.

Cylinder head cooling water passage 12 extends in cylinder head 2B in the cylinder arrangement direction from a cooling water outlet 2D provided at the other end in the cylinder arrangement direction of internal combustion engine 2, and divides into branches extending to cylinder block 2A along the individual cylinders and connecting to cylinder block cooling water passage 11. Accordingly, cylinder head cooling water passage 12 has a function to cool cylinder head 2B.

In this embodiment, cooling water passage 10 is configured to introduce cooling water first into cylinder block 2A and then discharge the cooling water from cylinder head 2B. However, the cooling water may flow through cylinder block 2A and cylinder head 2B in the opposite order. That is, cooling water passage 10 may alternatively be configured to introduce cooling water first into cylinder head 2B and then discharge the cooling water from cylinder block 2A.

To cooling water outlet 2D of cylinder head 2B, one end of a first cooling water pipe 101 is connected. The other end of first cooling water pipe 101 is connected to a cooling water inlet 21 of radiator 20. To a cooling water outlet 22 of radiator 20, one end of a second cooling water pipe 102 is connected. The other end of second cooling water pipe 102 is connected to a first inlet port 81 among four inlet ports 81, 82, 83, 84 of flow rate control valve 80.

One end of a third cooling water pipe 103 is connected to first cooling water pipe 101. The other end of third cooling water pipe 103 is connected to a second inlet port (first opening) 82 of flow rate control valve 80. EGR cooler 30, which constitutes an exhaust gas recirculation (EGR) system of internal combustion engine 2, is disposed at some midpoint of third cooling water pipe 103.

EGR cooler 30, which is a heat exchanger for cooling recirculated exhaust gas, exchanges heat between the cooling water flowing through third cooling water pipe 103 and the exhaust gas recirculated to the intake system of internal combustion engine 2 by the EGR system so as to lower the temperature of the exhaust gas recirculated to the intake system of internal combustion engine 2.

One end of a fourth cooling water pipe 104 is connected to first cooling water pipe 101. The other end of fourth cooling water pipe 104 is connected to a third inlet port 83 of flow rate control valve 80. Oil warmer 40 is disposed at some midpoint of fourth cooling water pipe 104. Oil warmer 40 is a heat exchanger for heating hydraulic fluid (oil) of transmission 3, which is a hydraulic mechanism.

Oil warmer 40 is configured to exchange heat between the cooling water flowing through fourth cooling water pipe 104 and hydraulic fluid (oil) of transmission 3. Thereby, oil warmer 40 accelerates the temperature rise of the hydraulic fluid (oil) of transmission 3 at cold engine start, and then maintains the hydraulic fluid (oil) of transmission 3 at a proper temperature by avoiding an excessive rise in the temperature of the hydraulic fluid (oil).

One end of a fifth cooling water pipe 105 is connected to first cooling water pipe 101. The other end of fifth cooling water pipe 105 is connected to a fourth inlet port (second opening) 84 of flow rate control valve 80. Various heat exchanging devices are disposed on fifth cooling water pipe 105. The heat exchanging devices disposed on fifth cooling water pipe 105 are, in the order from upstream to downstream, a heater core 50 for vehicle air heating, EGR control valve 60, which constitutes the EGR system of internal combustion engine 2, and throttle valve 70 configured to regulate the amount of air intake into internal combustion engine 2.

Heater core 50, which is a heat exchanger serving as an air conditioning heater included in a vehicle air conditioner (vehicle air heater), exchanges heat between the cooling water flowing through fifth cooling water pipe 105 and air for air-conditioning so as to heat the air for air-conditioning.

EGR control valve 60 is externally controlled so as to regulate the flow rate of the exhaust gas recirculated to the intake system of internal combustion engine 2, and configured to be warmed by exchanging heat with the cooling water flowing through fifth cooling water pipe 105. The EGR system is activated when EGR control valve 60 is opened so that the exhaust gas starts to be recirculated to the intake system.

Similarly, throttle valve 70 is configured to be warmed by exchanging heat with the cooling water flowing through the fifth cooling water pipe 105. Heating EGR control valve 60 and throttle valve 70 with the cooling water prevents the freezing of moisture in the exhaust gas around EGR control valve 60 as well as moisture in the intake air around throttle valve 70.

Flow rate control valve 80 has an outlet port (third opening) 85 communicating with four inlet ports 81 to 84. One end of a sixth cooling water pipe 106 is connected to outlet port 85. The other end of sixth cooling water pipe 106 is connected to an intake port 91 of electric water pump 90. One end of a seventh cooling water pipe 107 is connected to a discharge port 92 of electric water pump 90. The other end of seventh cooling water pipe 107 is connected to cooling water inlet 2C of cylinder block 2A.

One end of an eighth cooling water pipe (radiator-bypass pipe) 108 is connected to first cooling water pipe 101. The other end of eighth cooling water pipe 108 is connected to sixth cooling water pipe 106. Specifically, in first cooling water pipe 101, the point connected to eighth cooling water pipe 108 is located downstream to the points connected to third cooling water pipe 103, fourth cooling water pipe 104, and fifth cooling water pipe 105.

Flow rate control valve 80 includes a stator having four inlet ports 81 to 84 and single outlet port 85 formed therein, and a rotor having flow channels for connecting four inlet ports 81 to 84 to outlet port 85. The rotor is rotatably fitted in the stator. Flow rate control valve 80 is configured so that the opening areas of four inlet ports 81 to 84 vary depending on the rotation angle of the rotor with respect to the stator. Here, the rotation angle of the rotor is changed as the rotor is rotationally driven by the electric actuator such as an electric motor. Specifically, in flow rate control valve 80, the proportion of overlap area between each of the openings of four inlet ports 81 to 84 and the opening of the flow channel of the rotor facing thereto is adapted to vary in accordance with the rotation angle of the rotor so that predetermined opening areas of four inlet ports 81 to 84 can be specified by the choice of the rotation angle of the rotor.

The cooling water circuit of the cooling device for internal combustion engine 2 includes a plurality of paths: a first cooling water line L1, a second cooling water line (first path) L2, a third cooling water line L3, a fourth cooling water line (second path) L4, and a bypass line BL. The cooling water discharged from discharge port 92 of electric water pump 90 is supplied to cooling water passage 10 in internal combustion engine 2 through cooling water inlet 2C, and then discharged from cooling water passage 10 through cooling water outlet 2D. After that, the cooling water thus discharged flows through one or more paths of the cooling water lines L1 to L4 and the bypass line BL, and is then drawn into intake port 91 of electric water pump 90. In this way, the cooling water circulates through the cooling water circuit.

First cooling water line L1 includes first cooling water pipe 101 and second cooling water pipe 102 and configured to conduct the cooling water from cooling water outlet 2D of internal combustion engine 2 to first inlet port 81 of flow rate control valve 80 by way of radiator 20.

Second cooling water line L2 includes the segment, from the connection to cooling water outlet 2D to the connection to third cooling water pipe 103, of first cooling water pipe 101, and third cooling water pipe 103. Second cooling water line L2 is configured to conduct the cooling water from cooling water outlet 2D of internal combustion engine 2 to second inlet port (first opening) 82 of flow rate control valve 80 by way of EGR cooler 30 and bypassing radiator 20.

Third cooling water line L3 includes the segment, from the connection to cooling water outlet 2D to the connection to fourth cooling water pipe 104, of first cooling water pipe 101, and fourth cooling water pipe 104. Third cooling water line L3 is configured to conduct the cooling water from cooling water outlet 2D of internal combustion engine 2 to third inlet port 83 of flow rate control valve 80 by way of oil warmer 40 and bypassing radiator 20.

Fourth cooling water line L4 includes the segment, from the connection to cooling water outlet 2D to the connection to fifth cooling water pipe 105, of first cooling water pipe 101, and fifth cooling water pipe 105. Fourth cooling water line L4 is configured to conduct the cooling water from cooling water outlet 2D of internal combustion engine 2 to fourth inlet port (second opening) 84 of flow rate control valve 80 by way of heater core 50, EGR control valve 60, and throttle valve 70, and bypassing radiator 20.

Bypass line BL includes the segment, from the connection to cooling water outlet 2D to the connection to eighth cooling water pipe 108, of first cooling water pipe 101, and eighth cooling water pipe 108. Bypass line BL is configured to divert a portion of the cooling water flowing through first cooling water line L1 and let the diverted portion of the cooling water flow outside of radiator 20 and flow rate control valve 80 to reach a point downstream of flow rate control valve 80. Accordingly, bypass line BL allows for circulating the cooling water discharged from cooling water outlet 2D of internal combustion engine 2 through a route bypassing radiator 20, even when all inlet ports 81 to 84 of flow rate control valve 80 are closed.

In sum, after the cooling water has been discharged from discharge port 92 of electric water pump 90, then supplied to cooling water passage 10 in internal combustion engine 2 through cooling water inlet 2C, and discharged from cooling water passage 10 through cooling water outlet 2D, the cooling water flows in the following manner. First, the cooling water flows through any of cooling water lines L1 to L4 and bypass line BL at individual flow rates corresponding respectively to the relative sizes (size ratios) of the following five areas: the opening areas of inlet ports 81 to 84 of flow rate control valve 80 and the cross-sectional area of eighth cooling water pipe 108. After having flowed through any of cooling water lines L1 to L4 and bypass line BL, the cooling water is drawn into intake port 91 of electric water pump 90 so that the cooling water circulates in the above manner. Thus, flow rate control valve 80 is configured to cooperate with electric water pump 90 to regulate the flow rates of the cooling water through cooling water lines L1 to L4 and bypass line BL.

Flow rate control valve 80, electric water pump 90, and EGR control valve 60 are controlled by controller (control means) 110. Controller 110 includes a microcomputer having a central processing unit (CPU), a read only memory (ROM), a random access memory (RAM), and the like.

Controller 110 receives measurement signals from various sensors configured to measure operational conditions of internal combustion engine 2. The various sensors include a temperature sensor 111 and an external air temperature sensor 112. Temperature sensor 111 is configured to measure a cooling water temperature TW in first cooling water pipe 101 near cooling water outlet 2D. External air temperature sensor 112 is configured to measure an external air temperature TA. In addition, controller 110 receives a signal from an engine switch (ignition switch) 113 for turning on and off internal combustion engine 2. In accordance with the operational conditions of internal combustion engine 2, controller 110 controls the rotation angle of the rotor in flow rate control valve 80 and the rotation speed (discharge flow rate) of electric water pump 90.

Furthermore, in accordance with the operational conditions of internal combustion engine 2, controller 110 also calculates a target recirculation rate, which is a target flow rate of the exhaust gas to be recirculated to the intake system of internal combustion engine 2. Then, in accordance with the target recirculation rate thus calculated, controller 110 controls the opening degree of EGR control valve 60. Flow rate control valve 80 is provided with a rotation angular position sensor (not shown) configured to measure the rotation angle of the rotor. Controller 110 is configured to further receive a measurement signal from the rotation angular position sensor.

Port Opening Area Settings of Flow Rate Control Valve

Figure 2:
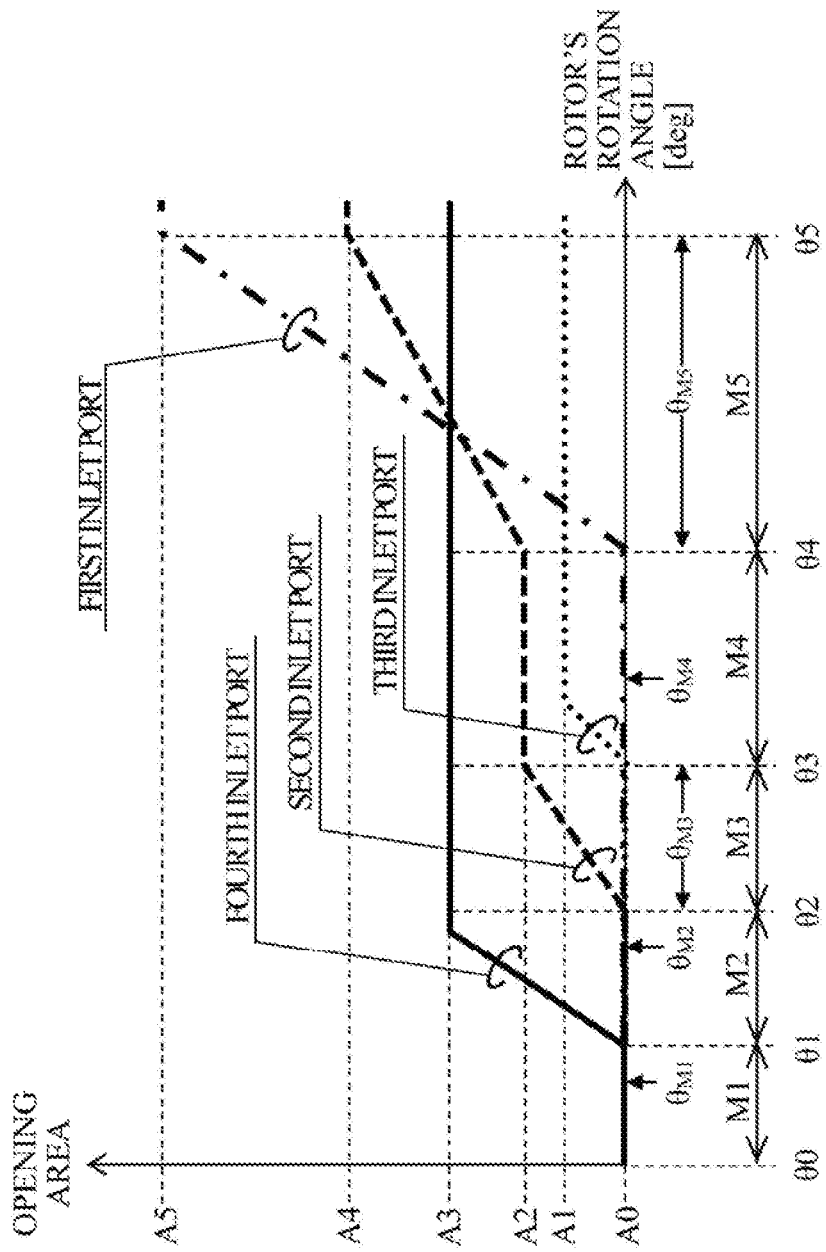
FIG. 2 is a graph for illustrating port opening area settings in a flow rate control valve.

Hereinafter, with reference to FIG. 2, the opening area settings of inlet ports 81 to 84 depending on the rotation angle of the rotor in flow rate control valve 80 will be described. FIG. 2 shows an example of the relationship between the rotation angle of the rotor and the opening areas of inlet ports 81 to 84 in flow rate control valve 80.

First Opening Mode

When the rotation angle of the rotor in flow rate control valve 80 is in the range from a rotation angle θ0 to a rotation angle θ1 (θ1>θ0), the opening areas of inlet ports 81 to 84 are set to a minimum opening area A0. As used herein, "first opening mode M1" refers to this port opening area setting. The rotation angle θ0 may, for example, be a reference rotation angle at which a stopper of the stator restricts the rotation of the rotor in flow rate control valve 80. The minimum opening area A0 not only refers to the zero opening area of the relevant one of inlet ports 81 to 84, but also refers to an opening area of the relevant one of inlet ports 81 to 84 that is sufficiently reduced but allows a slight cooling water leak therefrom.

Figure 3:
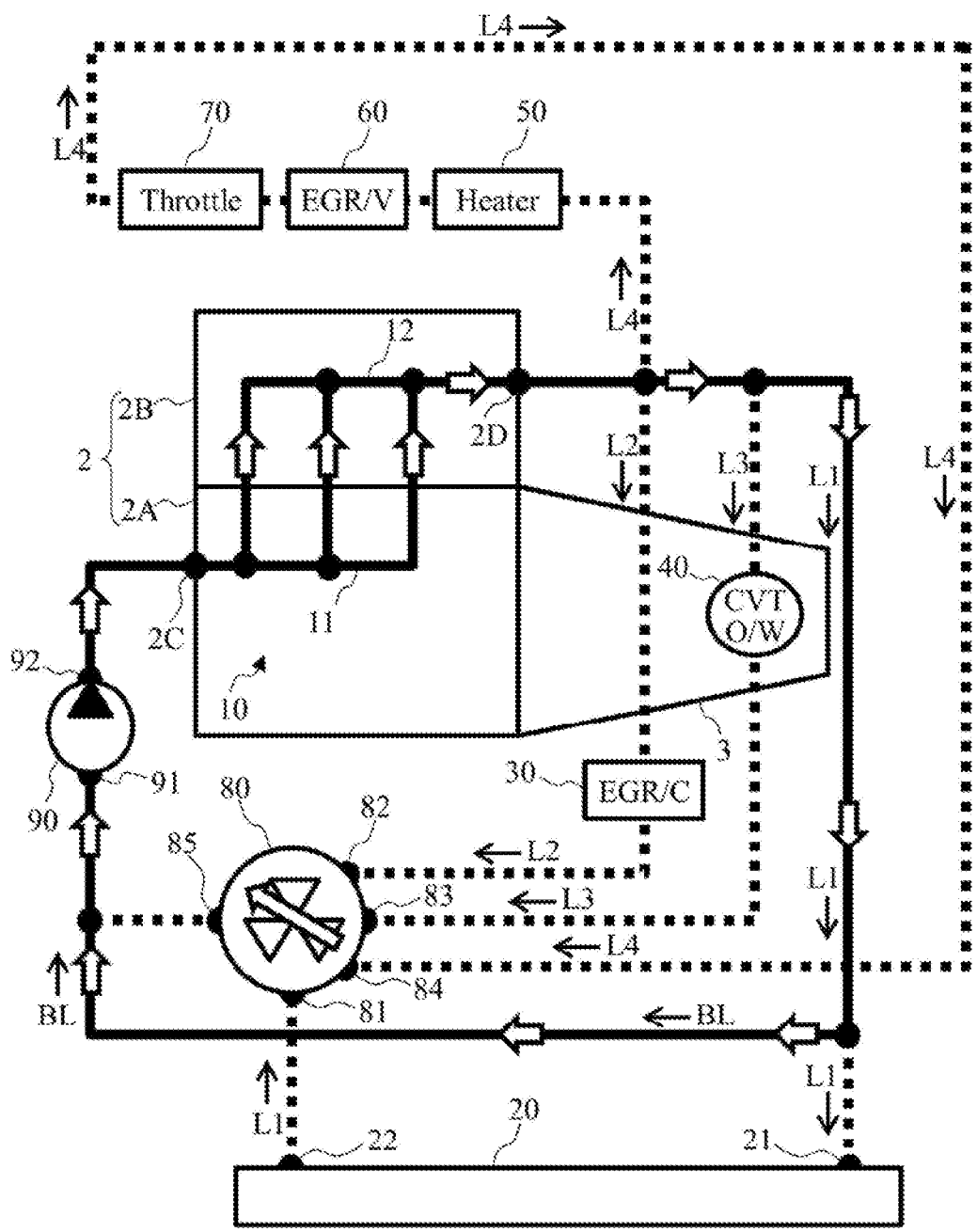
FIG. 3 is a diagram illustrating a path of cooling water in a first opening mode.
Figure 4:
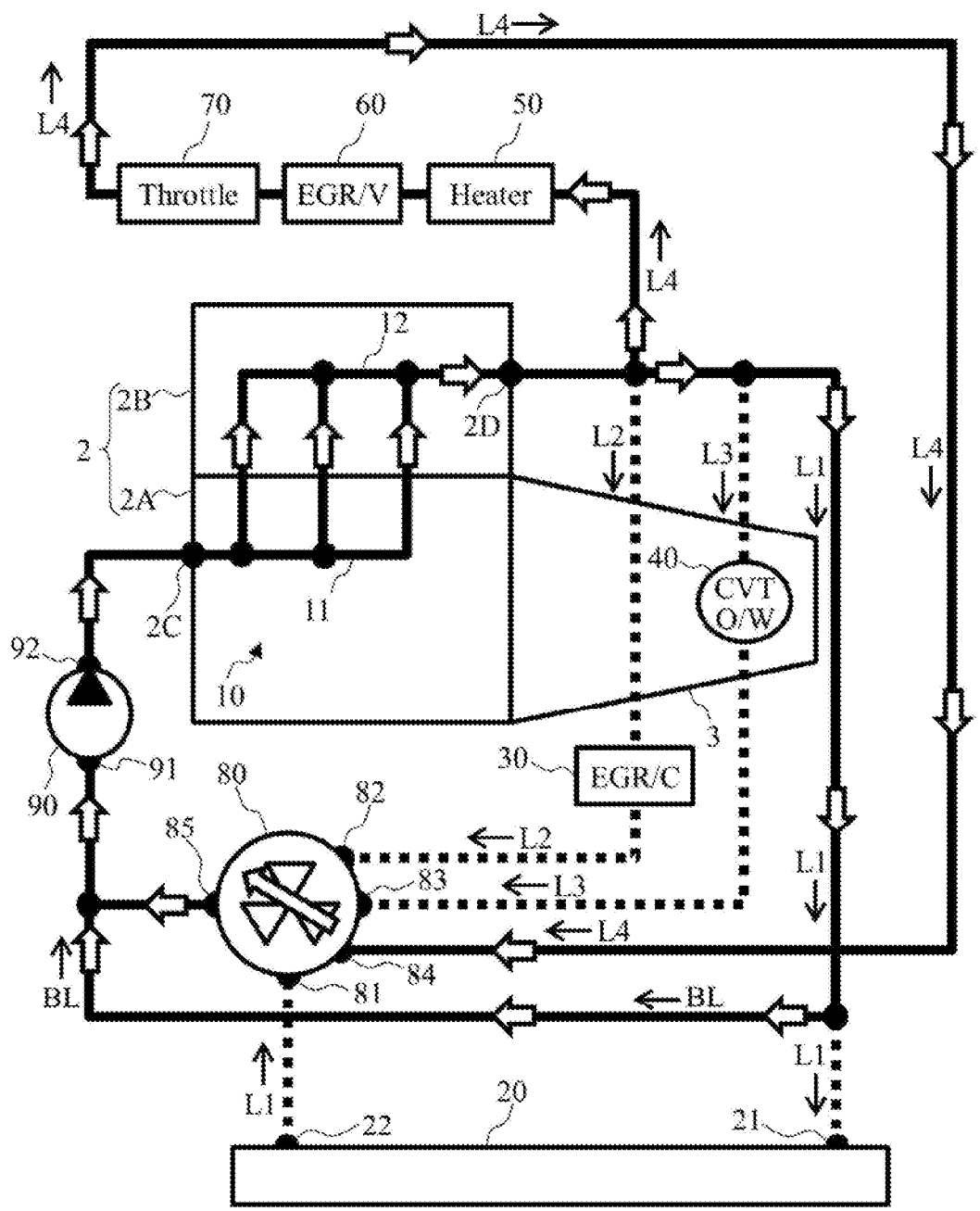
FIG. 4 is a diagram illustrating a path of the cooling water in a second opening mode.
Figure 5:
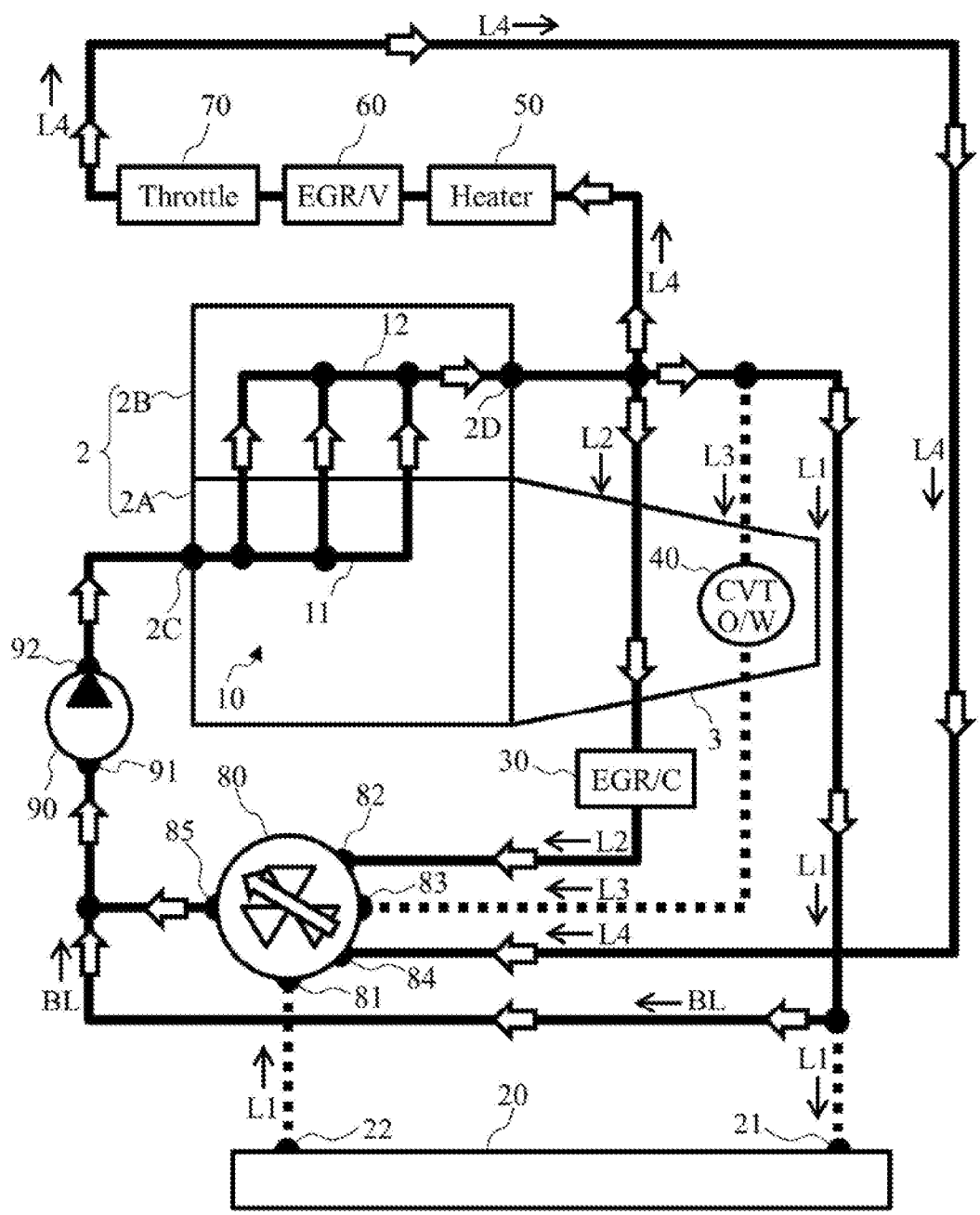
FIG. 5 is a diagram illustrating a path of the cooling water in a third opening mode.
Figure 6:
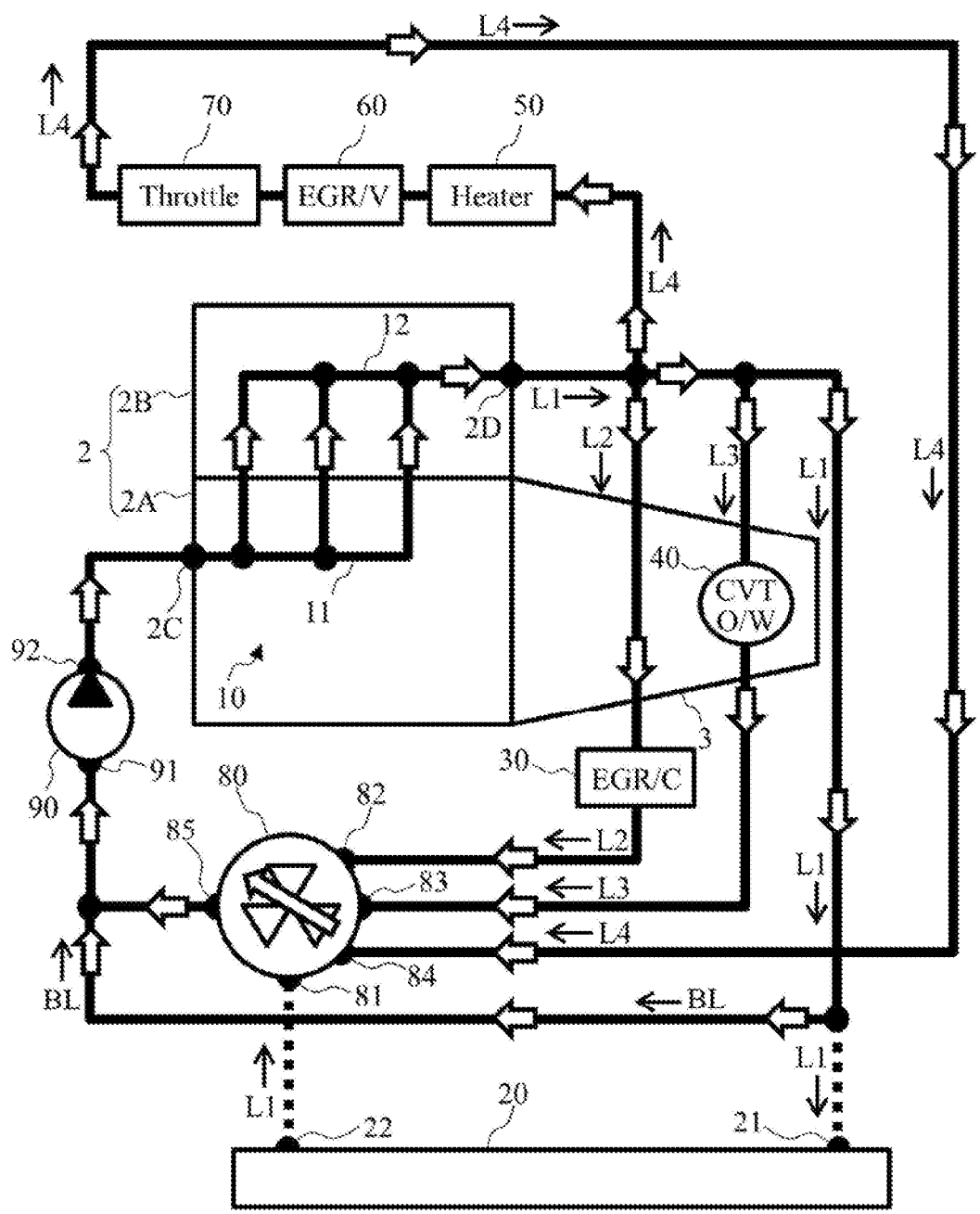
FIG. 6 is a diagram illustrating a path of the cooling water in a fourth opening mode.
Figure 7:
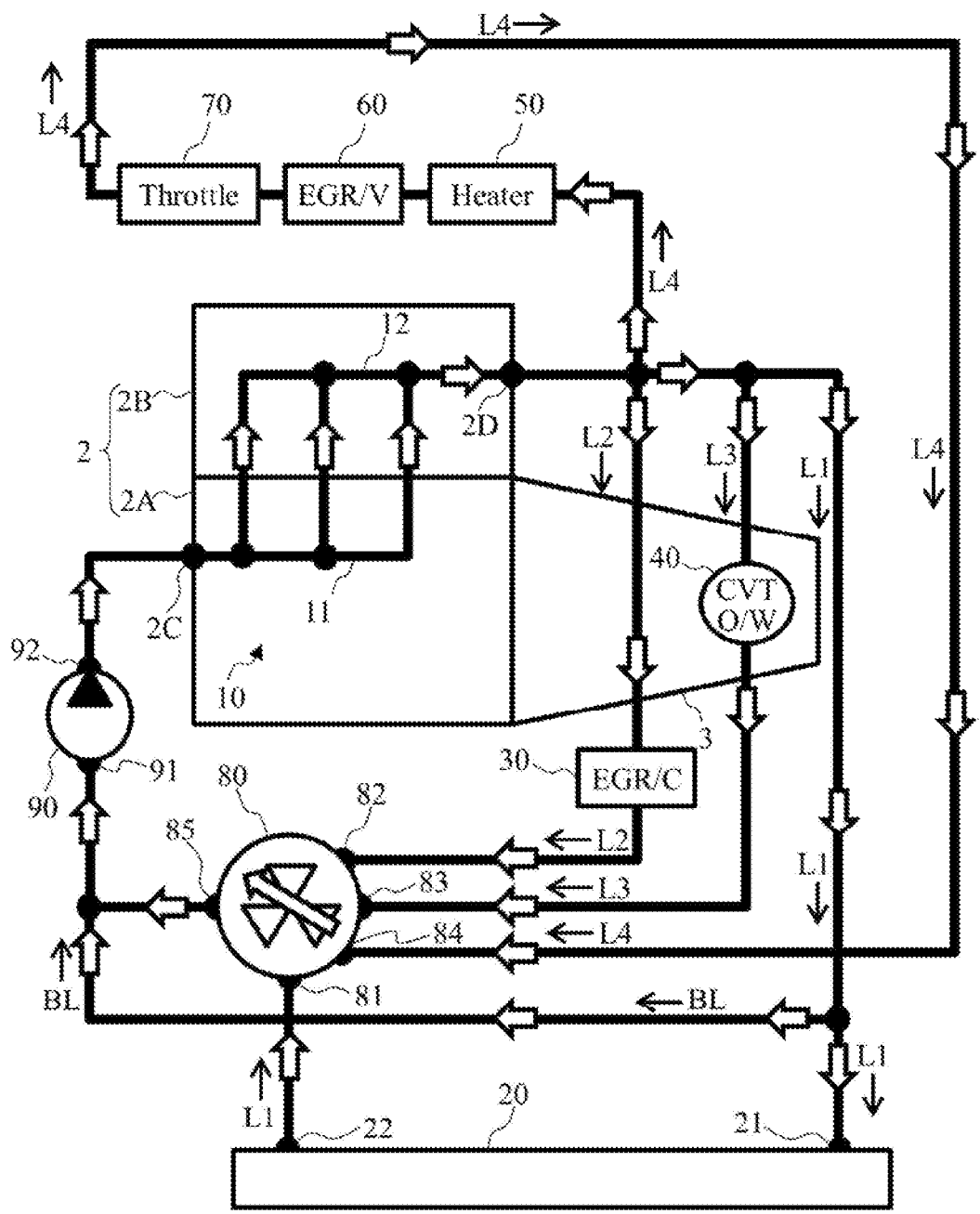
FIG. 7 is a diagram illustrating a path of the cooling water in a fifth opening mode.

In the first opening mode M1, all inlet ports 81 to 84 of flow rate control valve 80 have the minimum opening area A0. Accordingly, in FIG. 3, the cooling water circulates so that after the cooling water has been discharged from electric water pump 90, then supplied to cooling water passage 10 in internal combustion engine 2, and discharged from cooling water passage 10 through cooling water outlet 2D, most of the cooling water flows through bypass line BL and drawn into intake port 91 of electric water pump 90. Thus, in the first opening mode M1, the cooling water circulates so that the cooling water discharged from cooling water outlet 2D of internal combustion engine 2 returns without passing through the heat exchangers including radiator 20. Note that, in FIG. 3, each thick solid line indicates a path where cooling water flow is present, each dashed line indicates a path where cooling water flow is absent. The same applies to FIGS. 4 to 7.

Second Opening Mode

The inlet ports 81 to 84 are configured to have the following opening areas in the rotation angle range of the rotor greater than the rotation angle θ1 and equal to or less than the rotation angle θ2 (θ2>θ1) in flow rate control valve 80. As the rotation angle of the rotor increases, the opening area of fourth inlet port 84, which is at an end of fourth cooling water line L4, is increased from A0 to A3 (A3>A0). Meanwhile, the other inlet ports 81, 82, 83 are maintained at the minimum opening area A0 as in the first opening mode M1. As used herein, "second opening mode M2" refers to this port opening area setting.

In the second opening mode M2, only fourth inlet port 84 is open in flow rate control valve 80. Accordingly, in FIG. 4, the cooling water circulates so that after being supplied to cooling water passage 10 in internal combustion engine 2 and being discharged from cooling water passage 10 through cooling water outlet 2D, the cooling water flows through bypass line BL and fourth cooling water line L4. Specifically, the cooling water flows separately through bypass line BL and fourth cooling water line L4 at individual flow rates corresponding respectively to the relative sizes of the following two areas: the opening area of fourth inlet port 84 of flow rate control valve 80 and the cross-sectional area of eighth cooling water pipe 108. The portions of the cooling water flowing separately through bypass line BL and fourth cooling water line L4 join together at a point downstream of flow rate control valve 80 and are drawn into intake port 91 of electric water pump 90. In the second opening mode M2, the cooling water circulates in this way (indicated by thick solid lines in FIG. 4). As described above, in the second opening mode M2, the cooling water flow in the cooling water circuit splits into two branches; i.e., the flow passing through bypass line BL and the flow passing through the components such as heater core 50.

Third Opening Mode

The inlet ports 81 to 84 are configured to have the following opening areas in the rotation angle range of the rotor greater than the rotation angle θ2 and equal to or less than the rotation angle θ3 (θ3>θ2) in flow rate control valve 80. As the rotation angle of the rotor increases, the opening area of second inlet port 82, which is at an end of second cooling water line L2, is gradually increased from A0 to A2 (A2>A0). Meanwhile, fourth inlet port 84 is maintained at the opening area A3 (A3>A2) as in the second opening mode M2. As used herein, "third opening mode M3" refers to this port opening area setting.

In the third opening mode M3, inlet ports 82, 84 are open in flow rate control valve 80. Accordingly, in FIG. 5, the cooling water circulates so that after being supplied to cooling water passage 10 in internal combustion engine 2 and being discharged from cooling water passage 10 through cooling water outlet 2D, the cooling water flows through second cooling water line L2, fourth cooling water line L4, and bypass line BL. Specifically, the cooling water flows separately through second cooling water line L2, fourth cooling water line L4, and bypass line BL at individual flow rates corresponding respectively to the relative sizes of the following three areas: the opening areas of inlet ports 82, 84 of flow rate control valve 80 and the cross-sectional area of eighth cooling water pipe 108. The portions of the cooling water flowing separately through second cooling water line L2, fourth cooling water line L4, and bypass line BL join together at a point downstream of flow rate control valve 80 and are drawn into intake port 91 of electric water pump 90. In the third opening mode M3, the cooling water circulates in this way (indicated by thick solid lines in FIG. 5). As described above, in the third opening mode M3, the cooling water flow in the cooling water circuit splits into three branches; i.e., the flow passing through bypass line BL, the flow passing through the components such as heater core 50, and the flow passing through EGR cooler 30.

Fourth Opening Mode

The inlet ports 81 to 84 are configured to have the following opening areas in the rotation angle range of the rotor greater than the rotation angle θ3 and equal to or less than the rotation angle θ4 (θ4>θ3) in flow rate control valve 80. The opening area of third inlet port 83, which is at an end of third cooling water line L3, is increased from A0 to A1 (A1>A0). Meanwhile, fourth inlet port 84 is maintained at the opening area A3 (A3>A1) and second inlet port 82 is maintained at the opening area A2 (A2>A1) as in the third opening mode M3. As used herein, "fourth opening mode M4" refers to this port opening area setting.

In the fourth opening mode M4, inlet ports 82, 83, 84 are open in flow rate control valve 80. Accordingly, in FIG. 6, the cooling water circulates so that after being supplied to cooling water passage 10 in internal combustion engine 2 and being discharged from cooling water passage 10 through cooling water outlet 2D, the cooling water flows through second cooling water line L2, third cooling water line L3, fourth cooling water line L4, and bypass line BL. Specifically, the cooling water flows separately through second cooling water line L2, third cooling water line L3, fourth cooling water line L4, and bypass line BL at individual flow rates corresponding respectively to the relative sizes of the following four areas: the opening areas of inlet ports 82 to 84 of flow rate control valve 80 and the cross-sectional area of eighth cooling water pipe 108. The portions of the cooling water flowing separately through second cooling water line L2, third cooling water line L3, fourth cooling water line L4, and bypass line BL join together at a point downstream of flow rate control valve 80 and are drawn into intake port 91 of electric water pump 90. In the fourth opening mode M4, the cooling water circulates in this way (indicated by thick solid lines in FIG. 6). As described above, in the fourth opening mode M4, the cooling water flow in the cooling water circuit splits into four branches; i.e., the flow passing through bypass line BL, the flow passing through the components such as heater core 50, the flow passing through EGR cooler 30, and the flow passing through oil warmer 40.

Fifth Opening Mode

The inlet ports 81 to 84 are configured to have the following opening areas in the rotation angle range of the rotor greater than the rotation angle θ4 and equal to or less than the rotation angle θ5 (θ5>θ4) in flow rate control valve 80. As the rotation angle of the rotor increases, the opening area of second inlet port 82 is gradually increased from A2 to A4 (A4>A2) and the opening area of first inlet port 81, which is at an end of first cooling water line L1, is gradually increased from A0 to A5 (A5>A0). Meanwhile, fourth inlet port 84 is maintained at the opening area A3 (A3<A4<A5) and third inlet port 83 is maintained at the opening area A1 as in the fourth opening mode M4. As used herein, "fifth opening mode M5" refers to this port opening area setting.

In the fifth opening mode M5, inlet ports 81, 82, 83, 84 are open in flow rate control valve 80. Accordingly, in FIG. 7, the cooling water circulates so that after being supplied to cooling water passage 10 in internal combustion engine 2 and being discharged from cooling water passage 10 through cooling water outlet 2D, the cooling water flows through first cooling water line L1, second cooling water line L2, third cooling water line L3, fourth cooling water line L4, and bypass line BL. Specifically, the cooling water flows separately through first cooling water line L1, second cooling water line L2, third cooling water line L3, fourth cooling water line L4, and bypass line BL at individual flow rates corresponding respectively to the relative sizes of the following five areas: the opening areas of inlet ports 81 to 84 of flow rate control valve 80 and the cross-sectional area of eighth cooling water pipe 108. The portions of the cooling water flowing separately through first cooling water line L1, second cooling water line L2, third cooling water line L3, fourth cooling water line L4, and bypass line BL join together at a point downstream of flow rate control valve 80 and are drawn into intake port 91 of electric water pump 90. In the fifth opening mode M5, the cooling water circulates in this way (indicated by thick solid lines in FIG. 7). As described above, in the fifth opening mode M5, the cooling water flow in the cooling water circuit splits into five branches; i.e., the flow passing through bypass line BL, the flow passing through the components such as heater core 50, the flow passing through EGR cooler 30, the flow passing through oil warmer 40, and the flow passing through radiator 20.

The opening areas A1 to A5 used in the opening modes M1 to M5 may be the maximum opening areas of the relevant inlet ports. Furthermore, the opening areas A0 to A5 used in the opening modes M1 to M5 may be appropriately specified in accordance with the required relative flow rates of cooling water lines L1 to L4 as long as A0<A1, A0<A2, A0<A3, A0<A4, A0<A5, and A2<A4 are satisfied.

In sum, in flow rate control valve 80, the rotor is configured to rotate to the rotation angle ranges corresponding to the respective port opening area settings, that is, corresponding to the above five opening modes M1 to M5, thereby determining the relative flow rates (flow rate ratios) of cooling water through cooling water lines L1 to L4 and bypass line BL. Accordingly, flow rate control valve 80 serves as a flow rate adjusting mechanism configured to individually adjust the flow rates of cooling water through multiple circulation paths in the cooling water circuit. Controller 110 selects one of the opening modes M1 to M5 in accordance with the operational conditions of internal combustion engine 2, and specifies a target rotation angle of the rotor in flow rate control valve 80 based on the selected opening mode. Then, controller 110 controls flow rate control valve 80 so as to bring the actual rotation angle of the rotor to the target rotation angle.

Processing for Controlling Flow Rate Control Valve

Figure 8:
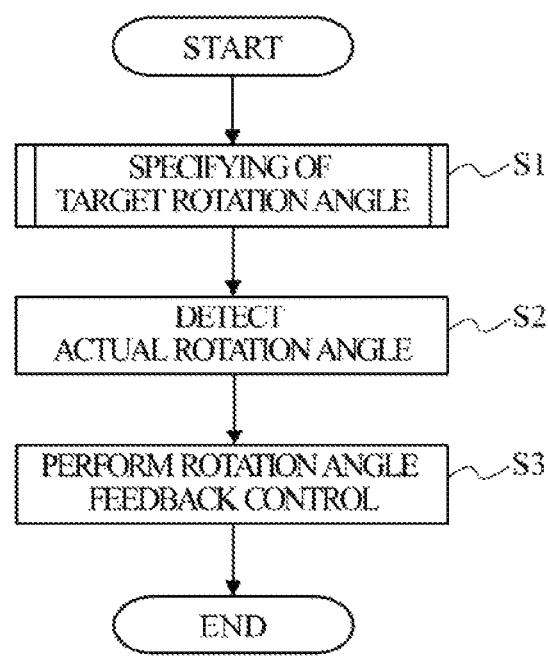
FIG. 8 is a flowchart of processing for controlling the flow rate control valve.

FIG. 8 shows an example of a main routine of processing for controlling flow rate control valve 80, which is iteratively performed by controller 110 triggered by the signal from ignition switch 113.

In step S1 (abbreviated as "S1" in FIG. 8; the same applies to the other steps below), controller 110 specifies the target rotation angle of the rotor in flow rate control valve 80. The details of specifying the target rotation angle will be described later.

In step S2, controller 110 detects the actual rotation angle of the rotor in flow rate control valve 80 based on the measurement signal received from the rotation angular position sensor (not shown).

In step S3, controller 110 controls flow rate control valve 80 so as to bring the actual rotation angle of the rotor in flow rate control valve 80 to the target rotation angle (such control will be referred to as rotation angle feedback control). Specifically, controller 110 calculates a deviation between the target rotation angle and the actual rotation angle, and outputs, to flow rate control valve 80, a control signal corresponding to the deviation.

Processing for Specifying Target Rotation Angle

Figure 9:
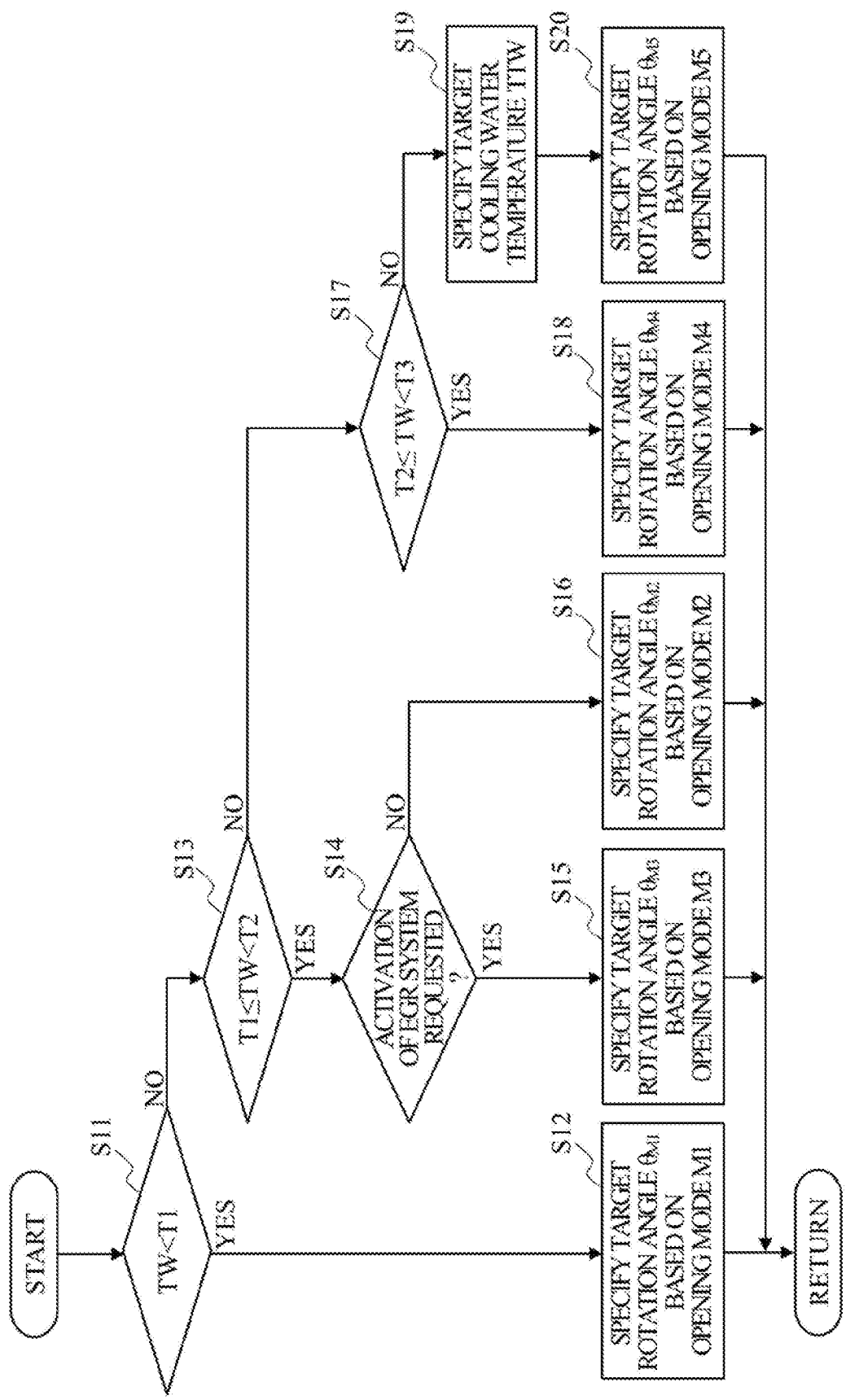
FIG. 9 is a flowchart of processing for specifying a target rotation angle.

FIG. 9 shows an example of a subroutine regarding the step of specifying the target rotation angle (step S1) in the main routine of FIG. 8.

In step S11, controller 110 determines whether the cooling water temperature TW detected based on the measurement signal from temperature sensor 111 is less than a first predetermined temperature T1. When controller 110 determines that the cooling water temperature TW is less than the first predetermined temperature T1 (YES), controller 110 decides that internal combustion engine 2 is in cold start, and the operation proceeds to step S12 for accelerating the increase of the cooling water temperature TW. On the other hand, if controller 110 determines that the cooling water temperature TW is equal to or higher than the first predetermined temperature T1 (NO), the operation proceeds to step S13.

In step S12, controller 110 selects the first opening mode M1 as the current port opening area setting of flow rate control valve 80. Then, as shown in FIG. 2, controller 110 specifies, as a fixed target rotation angle $\theta_{M1}$ of the rotor, a predetermined rotation angle within the rotation angle range ($\theta 0 \leq \theta_{M1} \leq \theta 1$) corresponding to the first opening mode M1.

Then, controller 110 performs the rotation angle feedback control so as to bring the actual rotation angle of the rotor to the fixed target rotation speed $\theta_{M1}$ specified in step S12, and controls electric water pump 90 at a sufficiently low rotation speed. Thus, until the cooling water temperature TW reaches the first predetermined temperature T1, the cooling water circulates at a minimum flow rate so that the cooling water discharged from cooling water outlet 2D of internal combustion engine 2 returns through bypass line BL without passing through the heat exchangers including radiator 20. This will accelerate the increase of the cooling water temperature TW.

In step S13, controller 110 determines whether the cooling water temperature TW detected based on the measurement signal from temperature sensor 111 is equal to or higher than the first predetermined temperature T1 and less than a second predetermined temperature T2 (T2>T1). When controller 110 determines that the cooling water temperature TW is equal to or higher than the first predetermined temperature T1 and less than the second predetermined temperature T2 (YES), the operation proceeds to step S14. On the other hand, when controller 110 determines that the cooling water temperature TW is not equal to or higher than the first predetermined temperature T1 or less than the second predetermined temperature T2 (i.e., determines that the cooling water temperature TW is equal to or higher than the second predetermined temperature T2) (NO), the operation proceeds to step S17.

In step S14, controller 110 determines whether activation of the EGR system is requested. Specifically, controller 110 determines whether activation of the EGR system is requested based on the operational conditions of internal combustion engine 2. When controller 110 determines that activation of the EGR system is requested (YES), the operation proceeds to S15. On the other hand, when controller 110 determines that activation of the EGR system is not requested (NO), the operation proceeds to step S16.

Figure 10:
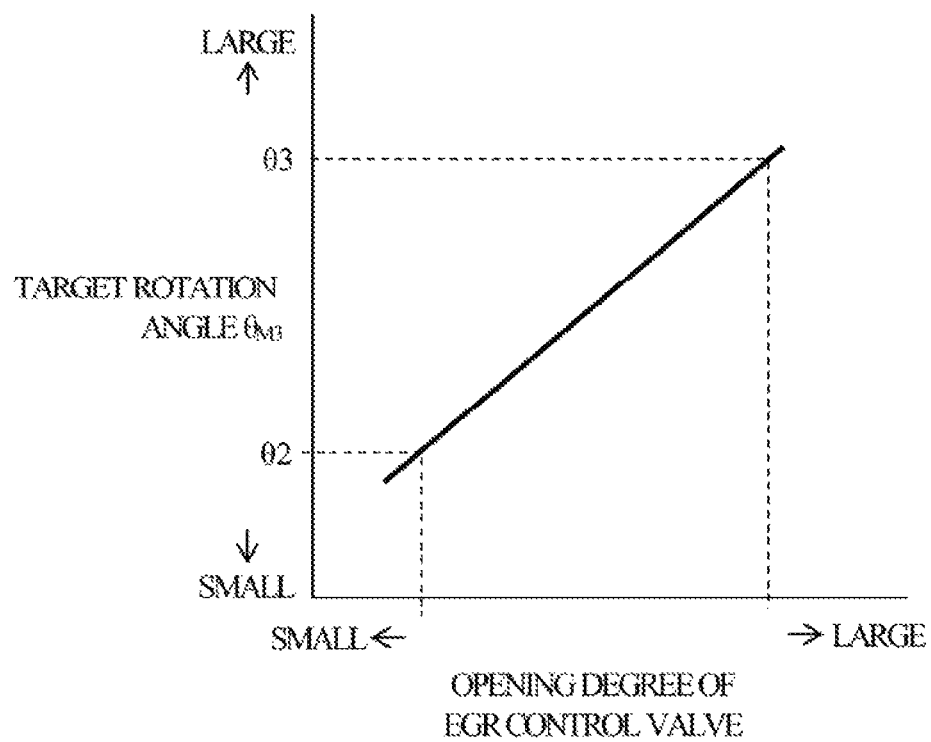
FIG. 10 is a graph illustrating the relationship between the target rotation angle and the opening degree of an EGR control valve.

In step S15, controller 110 selects the third opening mode M3 as the current port opening area setting of flow rate control valve 80. Then, as shown in FIG. 2, controller 110 specifies a variable target rotation angle $\theta_{M3}$ of the rotor in flow rate control valve 80 depending on the opening degree of EGR control valve 60 (depending on the target recirculation rate) in the rotation angle range ($\theta 2 < \theta_{M3} \leq \theta 3$) corresponding to the third opening mode M3. For example, a map as shown in FIG. 10, in which the target rotation angle $\theta_{M3}$ ($\theta 2 < \theta_{M3} \leq \theta 3$) in the third opening mode M3 is associated with the opening degree of EGR control valve 60, may be stored in advance in a ROM or the like, and controller 110 may refer to the map to determine the current target rotation angle $\theta_{M3}$. As described above, the opening degree of EGR control valve 60 is determined in accordance with the target recirculation rate, which is calculated in accordance with the operational conditions of internal combustion engine 2.

Then, controller 110 performs the rotation angle feedback control so as to bring the actual rotation angle of the rotor to the variable target rotation angle $\theta_{M3}$ specified in step S15. This allows the cooling water discharged from cooling water outlet 2D of internal combustion engine 2 to be supplied to EGR cooler 30 at a flow rate depending on the opening degree of EGR control valve 60 within a range up to the cooling water flow rate (predetermined flow rate) corresponding to the opening area A2.

Controller 110 varies the target rotation angle $\theta_{M3}$ depending on the opening degree of EGR control valve 60 for the following reason. Varying the target rotation angle $\theta_{M3}$ within the rotation angle range corresponding to the third opening mode M3 varies the opening area of second inlet port 82 within the range of A0 to A2 so that the relative flow rate (flow rate ratio) of cooling water through the second cooling water line L2 (i.e., the relative flow rate of the cooling water through EGR cooler 30) also varies accordingly. Controller 110 uses these correlations to increase the flow rate of the cooling water through EGR cooler 30 as the amount of heat exchanged from the exhaust gas to the cooling water in EGR cooler 30 increases, so that the exhaust gas recirculated to the intake system is appropriately cooled down in accordance with the recirculation rate. In sum, by varying the target rotation angle $\theta_{M3}$ depending on the opening degree of EGR control valve 60, controller 110 appropriately suppresses the temperature increase of the exhaust gas recirculated to the intake system in the EGR system so as to reduce the impact of exhaust gas recirculation on the intake charging efficiency.

Note that while controller 110 varies the target rotation angle $\theta_{M3}$ of the rotor in flow rate control valve 80 in the rotation angle range ($\theta 2 < \theta_{M3} \leq \theta 3$) corresponding to the third opening mode M3 as described above, the opening area of fourth inlet port 84 is maintained constant at A3 (see FIG. 2). Thus, the cooling water discharged from cooling water outlet 2D of internal combustion engine 2 is also supplied to fourth cooling water line L4 in which heater core 50, EGR control valve 60, and throttle valve 70 are disposed. This allows heater core 50 to exchange heat between the cooling water and the air for air-conditioning so as to warm the air for air-conditioning, and prevents freezing of EGR control valve 60 and throttle valve 70. After the EGR system is activated, the temperature of the cooling water is increased by the heat of the exhaust gas recirculated to the intake system while the cooling water is flowing through EGR cooler 30. Thus, the cooling water flow through EGR cooler 30 less affects the start-up performance (temperature rise performance) of the air heating function of heater core 50.

When the current port opening area setting is the third opening mode M3, controller 110 limits the opening area of second inlet port 82 up to A2. This is because allowing the cooling water to flow through EGR cooler 30 at an excessively high flow rate may hinder the warm-up of internal combustion engine 2 and may reduce the start-up performance of the air heating function of heater core 50.

In step S16, controller 110 selects the second opening mode M2 as the current port opening area setting of flow rate control valve 80. Then, as shown in FIG. 2, controller 110 specifies, as a fixed target rotation angle $\theta_{M2}$ of the rotor, a predetermined rotation angle within the rotation angle range ($\theta 1 < \theta_{M2} \leq \theta 2$) corresponding to the second opening mode M2.

Then, controller 110 performs the rotation angle feedback control so as to bring the actual rotation angle of the rotor to the fixed target rotation speed $\theta_{M2}$ specified in step S16. Thereby, when the EGR system is not in operation, the cooling water discharged from cooling water outlet 2D of internal combustion engine 2 is supplied not to EGR cooler 30 in second cooling water line L2, but to fourth cooling water line L4 in which heater core 50, EGR control valve 60, and throttle valve 70 are disposed. One aim of such control is to increase the temperature TW of the cooling water circulating through the cooling water circuit more rapidly than when the cooling water is allowed to flow through EGR cooler 30, so as to improve the start-up performance of the air heating function of heater core 50 and to enable earlier activation of the EGR system. Another aim is to prevent freezing of EGR control valve 60 and throttle valve 70.

In step S17, controller 110 determines whether the cooling water temperature TW detected based on the measurement signal from temperature sensor 111 is equal to or higher than the second predetermined temperature T2 and less than a third predetermined temperature T3 (T3>T2). When controller 110 determines that the cooling water temperature TW is equal to or higher than the second predetermined temperature T2 and less than the third predetermined temperature T3 (YES), the operation proceeds to step S18. On the other hand, when controller 110 determines that the cooling water temperature TW is not equal to or higher than the second predetermined temperature T2 or less than the third predetermined temperature T3 (i.e., determines that the cooling water temperature TW is equal to or higher than the third predetermined temperature T3) (NO), controller 110 decides that the warm-up of internal combustion engine 2 has been completed and the operation proceeds to step S19. The third predetermined temperature T3 corresponds to the temperature that the cooling water reaches when engine warm-up is completed (such cooling water temperature is referred to as "engine warm-up completion temperature").

In step S18, controller 110 selects the fourth opening mode M4 as the current port opening area setting of flow rate control valve 80. Then, as shown in FIG. 2, controller 110 specifies, as a fixed target rotation angle $\theta_{M4}$ of the rotor, a predetermined rotation angle within the rotation angle range ($\theta 3 < \theta_{M4} \leq \theta 4$) corresponding to the fourth opening mode M4.

Then, controller 110 performs the rotation angle feedback control so as to bring the actual rotation angle of the rotor to the fixed target rotation speed $\theta_{M4}$ specified in step S18. Thereby, the cooling water discharged from cooling water outlet 2D of internal combustion engine 2 is supplied to third cooling water line L3 in which oil warmer 40 is disposed, in addition to second cooling water line L2 and fourth cooling water line L4, in order to heat transmission oil and reduce friction in transmission 3. In the fourth opening mode M4, the flow rate of the coolant supplied to oil warmer 40 is maintained constant by the rotation angle feedback control as long as the rotation speed of electric water pump 90 is maintained constant.

Figure 11:
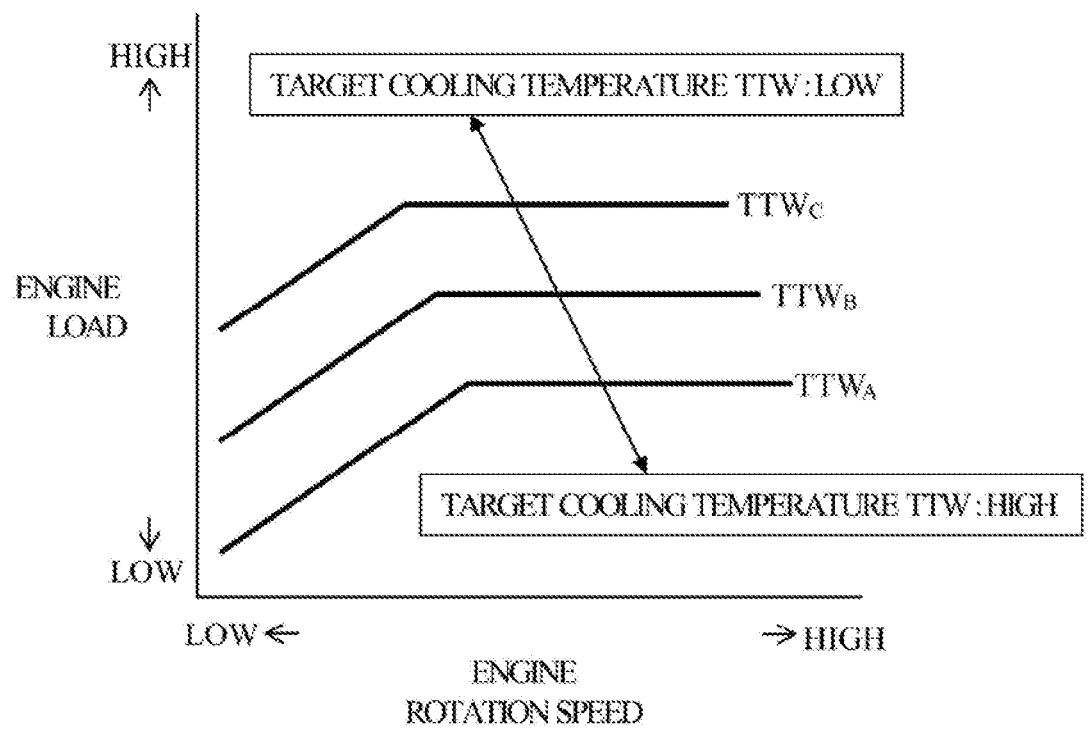
FIG. 11 is a graph illustrating the relationship between the engine load, engine rotation speed, and target cooling water temperature.

In step S19, based on the operational conditions of internal combustion engine 2, controller 110 specifies a target cooling water temperature TTW, which is a target value of the cooling water temperature TW. For example, the target cooling water temperature TTW may be defined to depend on two parameters indicating the engine rotation speed and the engine load as shown in FIG. 11, and may be stored in the ROM or the like. Examples of the parameter indicating the engine load include various parameters related to engine torque, fuel injection amount, intake air amount, intake pressure, and the like. As indicated by target cooling water temperatures $TTW_A$, $TTW_B$, $TTW_C$ ($TTW_C < TTW_B < TTW_A$) in FIG. 11, the target cooling water temperature TTW generally decreases as the engine rotation speed decreases and as the engine load increases. Controller 110 may correct the target cooling water temperature TTW according to the external air temperature TA detected based on the measurement signal from external air temperature sensor 112.

In step S20, controller 110 selects the fifth opening mode M5 as the current port opening area setting of flow rate control valve 80. Then, as shown in FIG. 2, controller 110 specifies a variable target rotation angle $\theta_{M5}$ of the rotor in flow rate control valve 80 in the rotation angle range ($\theta 4 < \theta_{M5} \leq \theta 5$) corresponding to the fifth opening mode M5. Varying the target rotation angle $\theta_{M5}$ of the rotor varies the opening area of first inlet port 81 within the range of A0 to A5 and thus varies the opening area of second inlet port 82 within the range of A2 to A4.

Within the rotation angle range ($\theta 4 < \theta_{M5} \leq \theta 5$), the variable target rotation angle $\theta_{M5}$ is calculated based on the deviation between the target cooling water temperature TTW specified in step S19 and the cooling water temperature TW detected based on the measurement signal from temperature sensor 111. For example, a map in which the deviation of the cooling water temperature TW from the target cooling water temperature TTW is associated with the target rotation angle $\theta_{M5}$ may be stored in advance in the ROM or the like, and controller 110 may refer to the map to determine the current target rotation angle $\theta_{M5}$.

Then, controller 110 performs the rotation angle feedback control so as to bring the actual rotation angle of the rotor to the variable target rotation angle $\theta_{M5}$ specified in step S20, and controls electric water pump 90 at a higher rotation speed than while internal combustion engine 2 is warming up. Thereby, controller 110 supplies the cooling water discharged from cooling water outlet 2D of internal combustion engine 2 to first cooling water line L1 in addition to second to fourth cooling water lines L2 to L4 while adjusting the flow rate of cooling water circulating by way of radiator 20, in order to bring the cooling water temperature TW closer to the target cooling water temperature TTW.

Furthermore, through the rotation angle feedback control of the rotor and the rotation speed control of electric water pump 90, controller 110 supplies the cooling water to EGR cooler 30 at a flow rate depending on the opening degree of EGR control valve 60 within a range for which lower limit is the above predetermined flow rate, after internal combustion engine 2 has been warmed up. Here, the opening area of second inlet port 82 in the fifth opening mode M5 is controlled in the following manner. The correspondence between the deviation of the cooling water temperature TW from the target cooling water temperature TTW and the opening degree of EGR control valve 60 is determined in advance through experiments or simulation. Based on the correspondence, at each variable target rotation angle $\theta_{M5}$ calculated based on the deviation of the cooling water temperature TW from the target cooling water temperature TTW, the opening area of second inlet port 82 is specified so that the cooling water can be supplied to EGR cooler 30 at a required flow rate depending on the opening degree of EGR control valve 60.

According to the above embodiment, when the cooling water temperature TW is equal to or higher than the first predetermined temperature T1 and the EGR system is not in operation, the cooling device stops supplying the cooling water discharged from cooling water outlet 2D of internal combustion engine 2 to the heat exchangers (including EGR cooler 30) except for heater core 50. Thereby, the temperature TW of the cooling water circulating through the cooling water circuit increases more rapidly than when the cooling water is allowed to flow through the heat exchangers including EGR cooler 30. This improves the start-up performance of the air heating function of heater core 50 and enables earlier activation of the EGR system.

Furthermore, the cooling device according to the above embodiment is configured to control the flow rate of cooling water through EGR cooler 30 depending on the opening degree of EGR control valve 60 after internal combustion engine 2 has been warmed up. Unlike cooling devices that are not configured to control the flow rate of the cooling water supplied to EGR cooler 30, the cooling device according to the above embodiment provides the following effects. If the temperature of the recirculated exhaust gas is not satisfactorily reduced, it will be difficult to advance the ignition timing, and this will reduce the effect of improving fuel economy provided by the exhaust gas recirculation. According to the above embodiment, such an adverse impact of insufficient cooling of the recirculated exhaust gas can be reduced. On the other hand, if the recirculated exhaust gas is excessively cooled, water condensation will occur in EGR cooler 30 and this will deteriorate fuel economy. According to the above embodiment, such an adverse impact of excessive cooling of the recirculated exhaust gas can also be reduced.

First Modification

Figure 12:
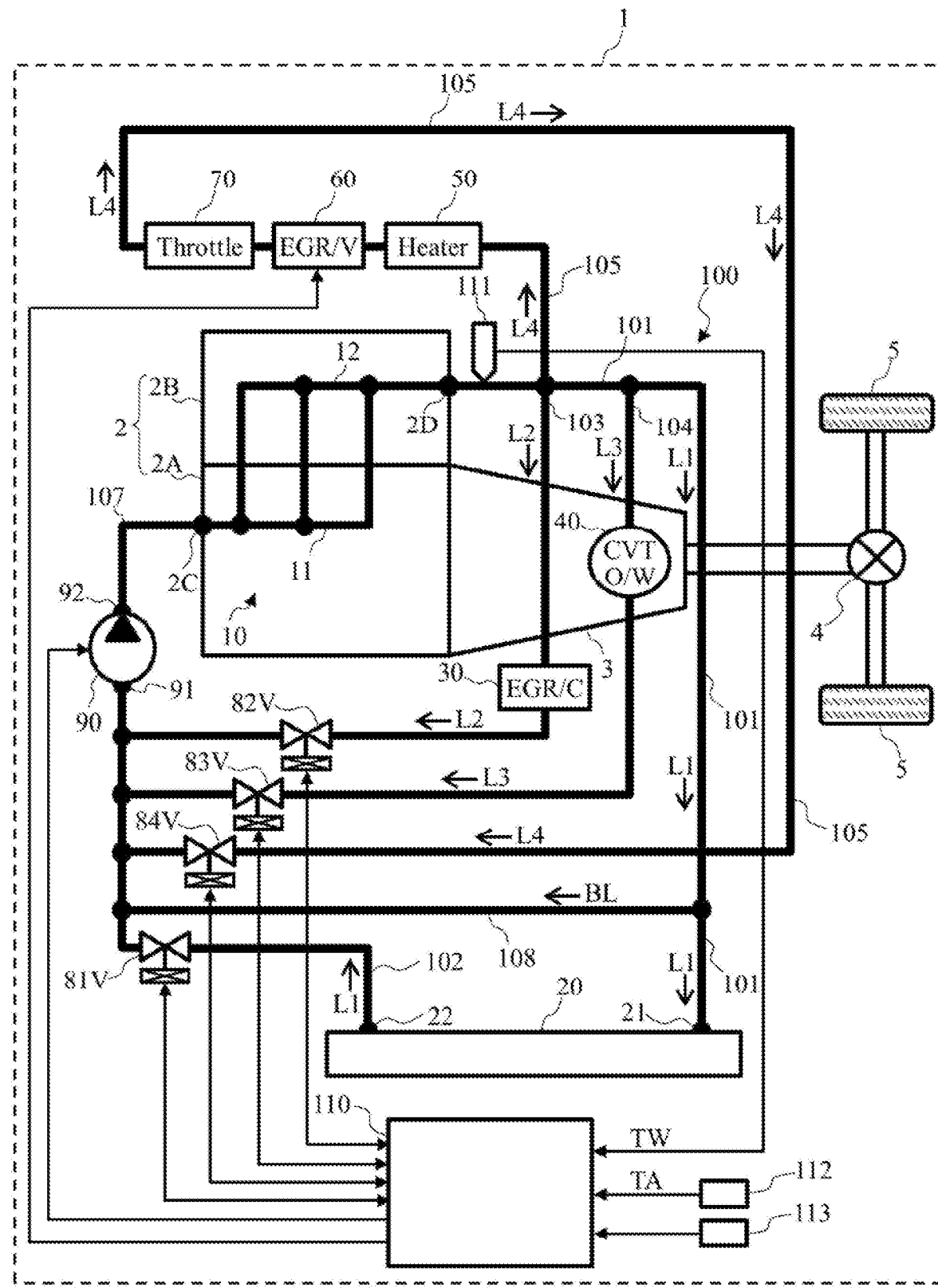
FIG. 12 is a schematic view of a first modification of the cooling device according to the embodiment.

FIG. 12 is a configuration diagram illustrating an example of a cooling device for an internal combustion engine of a vehicle, according to a first modification of the above embodiment. The first modification differs from the embodiment in that, as the flow rate adjusting mechanism, four separate control valves disposed one-to-one in cooling water lines L1 to L4 are used in place of flow rate control valve 80. Hereinafter, differences from the above embodiment will be described. The same reference numerals are given to the same components as those in the above embodiment, and the description thereof will be omitted or simplified. The same applies to a second modification, which will be described later.

One end of second cooling water pipe 102 is connected to cooling water outlet 22 of radiator 20. The other end of second cooling water pipe 102 is connected to intake port 91 of electric water pump 90. First cooling water pipe 101 is connected to ends of four pipes: one end of third cooling water pipe 103, one end of fourth cooling water pipe 104, one end of fifth cooling water pipe 105, and one end of eighth cooling water pipe 108. Second cooling water pipe 102 is connected to the other ends of the four pipes: the other end of third cooling water pipe 103, the other end of fourth cooling water pipe 104, the other end of fifth cooling water pipe 105, and the other end of eighth cooling water pipe 108.

First cooling water line L1 includes first cooling water pipe 101 and second cooling water pipe 102. Second cooling water line L2 includes the segment, from the connection to cooling water outlet 2D to the connection to third cooling water pipe 103, of first cooling water pipe 101, and third cooling water pipe 103. Third cooling water line L3 includes the segment, from the connection to cooling water outlet 2D to the connection to fourth cooling water pipe 104, of first cooling water pipe 101, and fourth cooling water pipe 104. Fourth cooling water line L4 includes the segment, from the connection to cooling water outlet 2D to the connection to fifth cooling water pipe 105, of first cooling water pipe 101, and fifth cooling water pipe 105.

In first cooling water line L1, a control valve 81V is interposed in the segment, between radiator 20 and the connection to eighth cooling water pipe 108, of second cooling water pipe 102. In second cooling water line L2, a control valve (first control valve) 82V is interposed in third cooling water pipe 103. In third cooling water line L3, a control valve 83V is interposed in fourth cooling water pipe 104. In fourth cooling water line L4, a control valve (second control valve) 84V is interposed in fifth cooling water pipe 105.

Each of control valves 81V to 84V is an electromagnetic valve of which the opening degree is controllable by an electric actuator that receives a control signal from controller 110. Controller 110 receives measurement signals output from opening degree sensors (not shown) configured to measure the respective opening degrees of control valves 81V to 84V. There are the following correspondences between the port opening areas of flow rate control valve 80 and the opening degrees of control valves 81V to 84V: the opening area of first inlet port 81 corresponds to the opening degree of control valve 81V; the opening area of second inlet port 82 corresponds to the opening degree of control valve 82V; the opening area of third inlet port 83 corresponds to the opening degree of control valve 83V; and the opening area of fourth inlet port 84 corresponds to the opening degree of control valve 84V.

Figure 13:
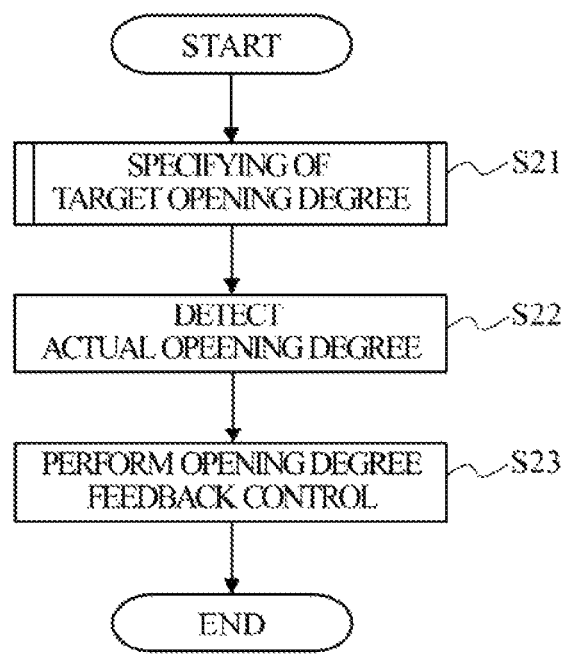
FIG. 13 is a flowchart of processing for controlling separate control valves.

FIG. 13 shows an example of a main routine of processing for controlling control valves 81V to 84V, which is iteratively performed by controller 110 triggered by the signal from ignition switch 113.

In step S21, controller 110 specifies the target opening degrees of control valves 81V to 84V as will be described later. In step S22, controller 110 detects the actual openings of control valves 81V to 84V based on the measurement signals from the opening degree sensors. Then, in step S23, controller 110 outputs control signals to the electric actuators of control valves 81V to 84V to bring the actual opening degrees of control valves 81V to 84V to the target opening degrees (such control will be referred to as opening degree feedback control).

Figure 14:
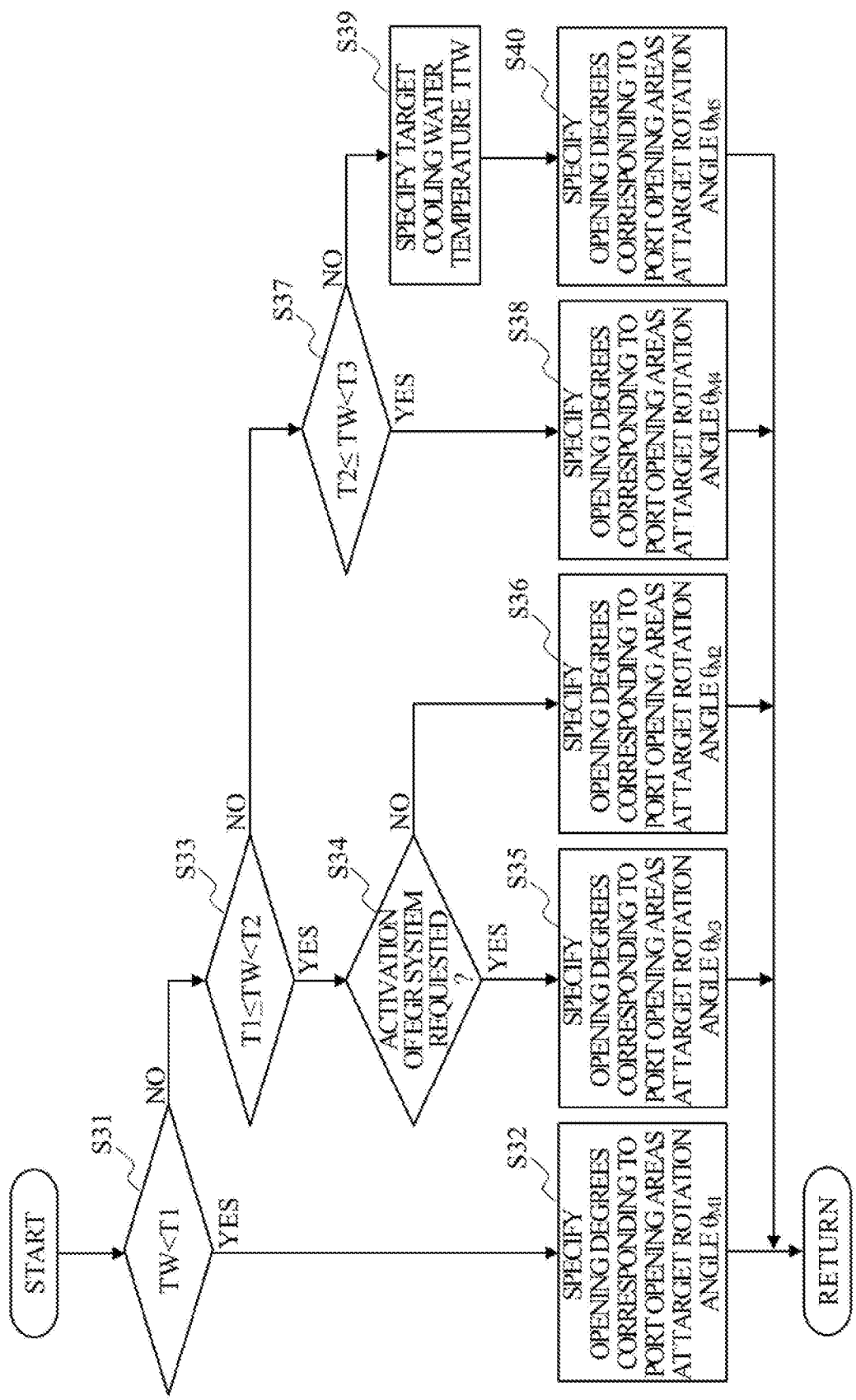
FIG. 14 is a flowchart of processing for specifying target opening degrees.

FIG. 14 shows an example of a subroutine regarding the step of specifying target opening degrees (step S21) in the main routine of FIG. 13. FIG. 14 is modification of FIG. 9 and steps S31, S33, S34, S37, S39 of FIG. 14 correspond to steps S11, S13, S14, S17, S19 of FIG. 9, respectively.

Hereinafter, the control processing performed by controller 110 in steps S32, S35, S36, S38, and S40 will be described. In step S32, as the current opening degrees of control valves 81V to 84V, controller 110 specifies opening degrees corresponding to the port opening areas at the target rotation angle $\theta_{M1}$. In step S35, as the current opening degrees of control valves 81V to 84V, controller 110 specifies opening degrees corresponding to the port opening areas at the target rotation angle $\theta_{M3}$. In step S36, as the current opening degrees of control valves 81V to 84V, controller 110 specifies opening degrees corresponding to the port opening areas at the target rotation angle $\theta_{M2}$. In step S38, as the current opening degrees of control valves 81V to 84V, controller 110 specifies opening degrees corresponding to the port opening areas at the target rotation angle $\theta_{M4}$. In step S40, as the current opening degrees of control valves 81V to 84V, controller 110 specifies opening degrees corresponding to the port opening areas at the target rotation angle $\theta_{M5}$.

According to the first modification, the cooling device uses, as the flow rate adjusting mechanism, four separate control valves disposed one-to-one in cooling water lines L1 to L4 in place of integrated flow rate control valve 80. As with the above embodiment, the cooling device having such a configuration is also able to improve the start-up performance of the air heating function of heater core 50 and enable earlier activation of the EGR system. In addition, as with the above embodiment, the cooling device is also able to reduce adverse impact of insufficient cooling and excessive cooling of the recirculated exhaust gas after internal combustion engine 2 has been warmed up.

Second Modification

Figure 15:
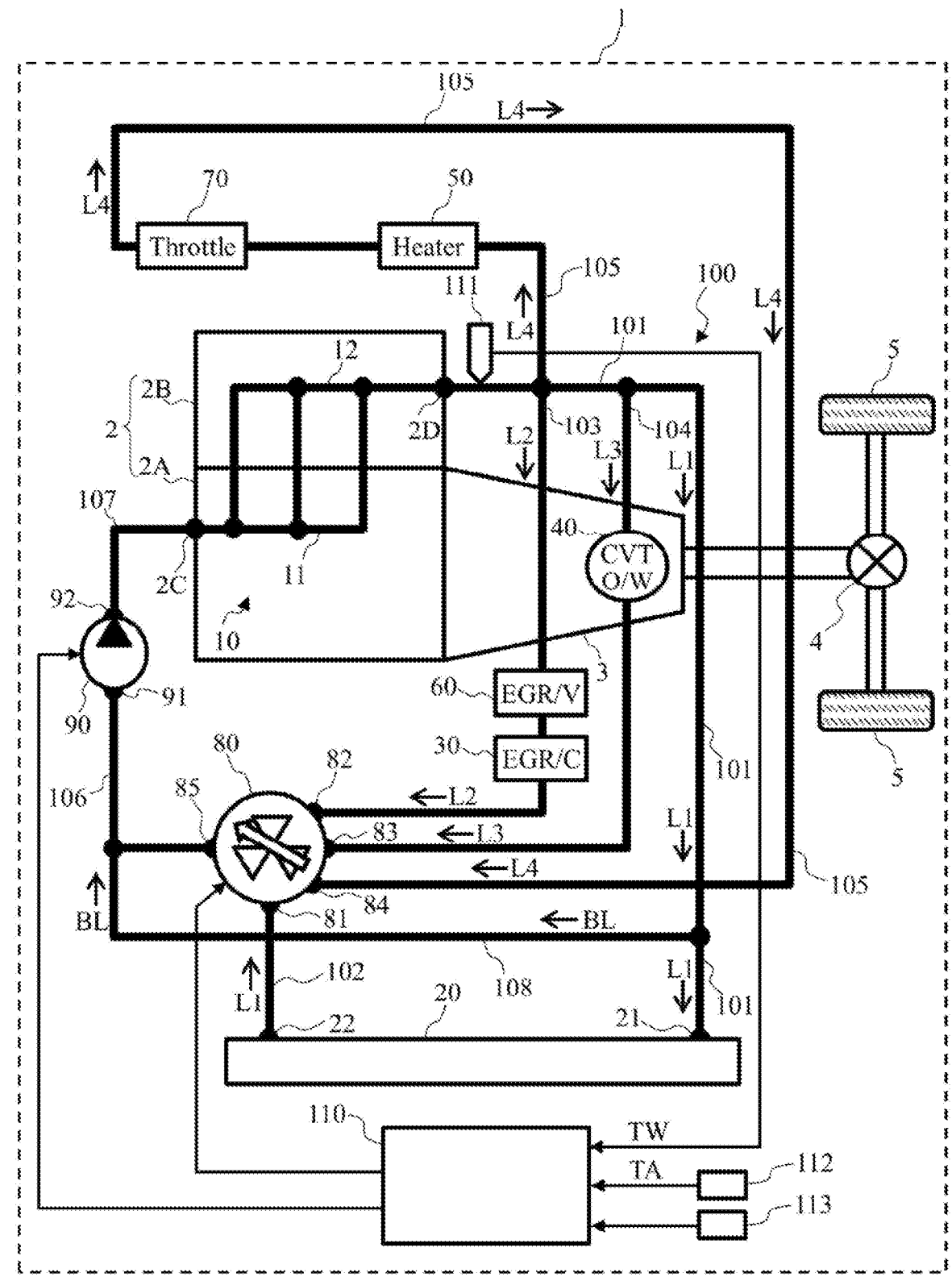
FIG. 15 is a schematic view of a second modification of the cooling device according to the embodiment.

FIG. 15 is a configuration diagram illustrating an example of a cooling device for the internal combustion engine of the vehicle, according to the second modification of the above embodiment. The second modification differs from the embodiment in that EGR control valve 60 is disposed in second cooling water line L2 instead of being disposed in fourth cooling water line L4. The cooling device having such a configuration in which EGR control valve 60 and EGR cooler 30 are disposed in second cooling water line L2 provides the same effects as in the above embodiment. In addition, this configuration allows for integration of EGR control valve 60 and EGR cooler 30. Such integration allows the cooling water to be supplied to EGR control valve 60 and EGR cooler 30 through single third cooling water pipe 103, and enables less complicated piping of the cooling water circuit.

Note that the configurations of the cooling device for internal combustion engine 2 which have been described in the above embodiment and first and second modifications are merely illustrative. In applications of the present invention, at least one of oil warmer 40, throttle valve 70, and EGR control valve 60 in the cooling water circuit may be omitted. Furthermore, electric water pump 90 may be replaced with a mechanical water pump driven by output produced by the shaft of internal combustion engine 2. Additionally, EGR control valve 60 may be controlled by a control device different from controller 110. In this case, based on a signal related to the controlled conditions of EGR control valve 60 retrieved or received from this different control device, controller 110 determines whether the EGR system is in operation and how much the opening degree of EGR control valve 60 is.

As the flow rate adjusting mechanism, integrated flow rate control valve 80 is used in the above embodiment and the second modification, and separate control valves 81V to 84V are used in the first modification. Instead of these, a combination of an integrated flow rate control valve and separate control valves may be used as an alternative flow rate adjusting mechanism. Specifically, any two of cooling water lines L1 to L4 may be connected to an integrated flow rate control valve and the remaining two cooling water lines may be provided individually with separate control valves. Alternatively, any three of cooling water lines L1 to L4 may be connected to an integrated flow rate control valve and the remaining one cooling water line may be provided with a separate control valve. For example, in FIG. 12, first cooling water line L1 and third cooling water line L3 may be connected to an integrated flow rate control valve, and control valves 81V, 83V may be omitted, in the configuration using control valve 82V disposed in second cooling water line L2 and control valve 84V disposed in fourth cooling water line L4. Alternatively, first cooling water line L1, third cooling water line L3, and fourth cooling water line L4 may be connected to an integrated flow rate control valve, and control valves 81V, 83V, 84V may be omitted, in the configuration using control valve 82V disposed in second cooling water line L2.

Although not described in detail in the above embodiment and first and second modifications, controller 110 may control the rotation speed of electric oil water pump 90 in each of the opening modes M1 to M5 in accordance with the actual opening areas of inlet ports 81 to 84 so that if the opening area of any one of inlet ports 81 to 84 is unchanged, the corresponding one of cooling water lines L1 to L4 is supplied with coolant at a fixed absolute flow rate. This control reflects correlations in which a change in the opening area of an inlet port affects the ratios of the opening areas of all the inlet ports to the total opening area, and thus, affects the ratios of the flow rates of cooling water through the cooling water lines to the total flow rate of the cooling water circuit. Here, as shown in FIG. 2, the opening areas of inlet ports 81 to 84 are adapted to correspond to the rotation angle of the rotor in flow rate control valve 80. Thus, controller 110 identifies the actual opening areas of inlet ports 81 to 84 based on the actual rotation angle of the rotor determined using the measurement signal from the rotation angle position sensor (not shown) for flow rate control valve 80.

For example, controller 110 may increase the rotation speed of electric water pump 90 as the total opening area of inlet ports 81 to 84 in flow rate control valve 80 increases from that in the first opening mode M1. Specifically, the total opening area is A0 in the first opening mode M1, and changes up to A3 in the second opening mode M2. Thus, in the second opening mode M2, controller 110 may increase the rotation speed of electric water pump 90 by an amount corresponding to the increase amount (up to (A3−A0)) of the total opening area relative to that in the first opening mode M1. The total opening area changes up to A3+A2 in the third opening mode M3. Thus, in the third opening mode M3, controller 110 may increase the rotation speed of electric water pump 90 by an amount corresponding to the increase amount (up to (A3+A2−A0)) of the total opening area relative to that in the first opening mode M1. The same applies to the fourth opening mode M4 and the fifth opening mode M5.

REFERENCE SYMBOL LIST

2 Internal combustion engine
10 Cooling water passage
50 Heater core
60 EGR control valve
80 Flow rate control valve
82 Second inlet port (first opening)
84 Fourth inlet port (second opening)
85 Outlet port (third opening)
82v Control valve (first control valve)
84v Control valve (second control valve)
100 Pipe
110 Controller (control means)
111 Temperature sensor
L2 Second cooling water line (first path)
L4 Fourth cooling water line (second path)
T1 First predetermined temperature (predetermined temperature)
T3 Third predetermined temperature (engine warm-up completion temperature)

The invention claimed is:
1. A cooling device for an internal combustion engine having an EGR system configured to recirculate, to an intake system, a portion of exhaust gas from the internal combustion engine, the cooling device comprising:
 a coolant circuit for circulating a coolant through the internal combustion engine and an outside thereof;
 a flow rate adjusting mechanism configured to individually adjust a flow rate of the coolant through an EGR cooler provided in the coolant circuit and a flow rate of the coolant through an air conditioning heater provided in the coolant circuit; and
 a controller configured to control the flow rate adjusting mechanism,
 wherein at cold start of the internal combustion engine, the controller controls the flow rate adjusting mechanism so as to shut off supply of the coolant to the EGR cooler and the air conditioning heater, when a temperature of the coolant is less than a first predetermined temperature, and allow supply of the coolant to the air conditioning heater and shut off supply of the coolant to the EGR cooler until the EGR system is activated, when the temperature of the coolant is equal to or higher than the first predetermined temperature.

2. The cooling device for the internal combustion engine, according to claim 1, wherein when, while the EGR system is activated, the temperature of the coolant is equal to or higher than the first predetermined temperature and less than an engine warm-up completion temperature, which is higher than the first predetermined temperature, the controller controls the flow rate adjusting mechanism so that a flow rate of the coolant through the EGR cooler is adjusted within a range equal to or less than a predetermined flow rate in accordance with an opening degree of an EGR control valve configured to control a recirculation rate of the exhaust gas to the intake system in the EGR system.

3. The cooling device for the internal combustion engine, according to claim 2, wherein when the temperature of the coolant is equal to or higher than the engine warm-up completion temperature, the controller controls the flow rate adjusting mechanism so that the flow rate of the coolant through the EGR cooler is adjusted within a range equal to or higher than the predetermined flow rate in accordance with the opening degree of the EGR control valve.

4. The cooling device for the internal combustion engine, according to claim 1, wherein the coolant circuit has a plurality of paths for circulating the coolant, and wherein the EGR cooler is disposed in a first path of the plurality of paths, and the air conditioning heater is disposed in a second path of the plurality of paths, the second path being different from the first path.

5. The cooling device for the internal combustion engine, according to claim 4, wherein the flow rate adjusting mechanism is a flow rate control valve including:

a stator having a first opening connected to the first path, a second opening connected to the second path, and a third opening; and a rotor having a flow channel connecting the first opening and the second opening to the third opening, the rotor being rotatably fitted in the stator, and wherein the flow rate control valve is configured so that an opening area of the first opening and an opening area of the second opening vary depending on a rotation angle of the rotor.

6. The cooling device for the internal combustion engine, according to claim 4, wherein the flow rate adjusting mechanism includes a first control valve provided in the first path and a second control valve provided in the second path.

7. The cooling device for the internal combustion engine, according to claim 4, wherein an EGR control valve configured to control a recirculation rate of the exhaust gas to the intake system in the EGR system is further disposed in the first path.

8. The cooling device for the internal combustion engine, according to claim 2, wherein the flow rate adjusting mechanism further adjusts a flow rate of the coolant through an oil warmer configured to heat hydraulic fluid of a transmission connected to an output shaft of the internal combustion engine, and wherein when the temperature of the coolant is equal to or higher than a second predetermined temperature and less than the engine warm-up completion temperature, the controller controls the flow rate adjusting mechanism so that the flow rate of the coolant through the oil warmer is adjusted to be constant, the second predetermined temperature being higher than the first predetermined temperature.

9. The cooling device for the internal combustion engine, according to claim 8, wherein when the temperature of the coolant is less than the second predetermined temperature within a range equal to or higher than the first predetermined temperature and less than the engine warm-up completion temperature, the controller controls the flow rate adjusting mechanism so that the flow rate of the coolant through the EGR cooler is adjusted within a range equal to or less than the predetermined flow rate.

10. A method for cooling an internal combustion engine having an EGR system configured to recirculate, to an intake system, a portion of exhaust gas from the internal combustion engine, the method comprising:

at cold start of the internal combustion engine, shutting off supply of a coolant to an EGR cooler and an air conditioning heater which are provided in a coolant circuit for circulating the coolant through the internal combustion engine and an outside thereof, when a temperature of the coolant is less than a first predetermined temperature; and allowing supply of the coolant to the air conditioning heater and shutting off supply of the coolant to the EGR cooler until the EGR system is activated, when the temperature of the coolant is equal to or higher than the first predetermined temperature.

* * * * *